(12) United States Patent
Miyata et al.

(10) Patent No.: US 8,009,683 B2
(45) Date of Patent: Aug. 30, 2011

(54) IP NETWORK SYSTEM

(75) Inventors: Hiroshi Miyata, Musashino (JP);
Yukiyo Akisada, Musashino (JP);
Masahito Endo, Musashino (JP); Hiroki Endo, Musashino (JP); Kensuke Hosoya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 336 days.

(21) Appl. No.: 12/288,151

(22) Filed: Oct. 16, 2008

(65) Prior Publication Data
US 2009/0103550 A1      Apr. 23, 2009

(30) Foreign Application Priority Data
Oct. 17, 2007   (JP) ................................. 2007-269628

(51) Int. Cl.
*H04L 12/28*    (2006.01)
(52) U.S. Cl. ....................................................... 370/404
(58) Field of Classification Search ........................ None
See application file for complete search history.

(56) References Cited

U.S. PATENT DOCUMENTS 6,222,848 B1 * 4/2001 Hayward et al. .............. 370/412
2003/0227919 A1 * 12/2003 Zelig et al. ..................... 370/392

FOREIGN PATENT DOCUMENTS

JP   2005-218112        8/2005
JP   2005-218112 A      8/2005

* cited by examiner

*Primary Examiner* — Chirag G Shah
*Assistant Examiner* — Otis L Thompson, Jr.
(74) *Attorney, Agent, or Firm* — Sughrue Mion, PLLC

(57) ABSTRACT

There is provided an IP network system. The IP network system includes: a plurality of relays making up a ring network; a source host for transmitting a packet and connected to the ring network; and a destination host which conducts a packet communication with the source host through the ring network. Each of the relays is operable to transfer received packets containing a transfer direction information to the destination host through a right-handed route of the ring network and through a left-handed route of the ring network, based on the transfer direction information.

6 Claims, 22 Drawing Sheets

FIG. 4

| ROUTE 1 |
|---|
| ROUTE 2 |
| ROUTE 3 |
| ⋮ |
| ⋮ |
| ROUTE n |

| DESTINATION ADDRESS | IPv6 ADDRESS OF HOST |
|---|---|
| TUNNEL END POINT ADDRESS | IPv6 ADDRESS OF TUNNELING UNIT 16 |
| PACKET ID | PKT0 |
| RING ID | RING1 |
| RIGHT-HANDED PACKET TRANSFER DESTINATION | C::1 |
| LEFT-HANDED PACKET TRANSFER DESTINATION | C::3 |

FIG. 5

| ALREADY-TRANSFERRED PACKET INFORMATION 1 |
|---|
| ALREADY-TRANSFERRED PACKET INFORMATION 2 |
| ALREADY-TRANSFERRED PACKET INFORMATION 3 |
| ⋮ |
| ALREADY-TRANSFERRED PACKET INFORMATION n |

| TIME STAMP | 20070910-22:30:10.113591 |
|---|---|
| TUNNEL START POINT ADDRESS | IPv6 ADDRESS OF TUNNELING UNIT 12 |
| PACKET ID | PKT0 |

*FIG. 13*

| PACKET: P21 | | |
|---|---|---|
| IPv6 HEADER (1) | | |
| | START POINT IP ADDRESS | IPv6 ADDRESS OF TUNNELING UNIT 12 |
| | END POINT IP ADDRESS | IPv6 ADDRESS OF TUNNELING UNIT 16 |
| HOP-BY-HOP OPTION HEADER | | |
| | ROUTE DIRECTION | 1 (LEFT-HANDED DIRECTION) |
| | RING ID | RING 1 |
| DESTINATION OPTION HEADER | | |
| | PACKET ID | PKT0 |
| IPv6 HEADER (2) | | |
| | START POINT IP ADDRESS | IPv6 ADDRESS OF HOST 11 |
| | END POINT IP ADDRESS | IPv6 ADDRESS OF HOST 17 |
| PAYLOAD | | |

| PACKET: P30 | | |
|---|---|---|
| IPv6 HEADER | | |
| | START POINT IP ADDRESS | A::1 |
| | END POINT IP ADDRESS | LINK LOCAL MULTICAST ADDRESS (EXAMPLE: ff02::100) |
| PAYLOAD | | |
| | MESSAGE TYPE | ADVERTISING |
| | RING ID | RING 1 |
| | ROUTER ID | A::1 |
| | NUMBER OF HOPS | 0 |

FIG. 20

| DIRECTION DETERMINATION PACKET: P40 | | |
|---|---|---|
| IPv6 HEADER | | |
| | START POINT IP ADDRESS | A::1 |
| | END POINT IP ADDRESS | A::2 |
| PAYLOAD | | |
| | MESSAGE TYPE | DIRECTION DETERMINATION |
| | RING ID | RING 1 |
| | ROUTER ID | A::1 |
| | NUMBER OF HOPS | 0 |

FIG. 21

| DIRECTION DETERMINATION REFUSAL PACKET: P41 | | |
|---|---|---|
| IPv6 HEADER | | |
| | START POINT IP ADDRESS | A::2 |
| | END POINT IP ADDRESS | A::1 |
| PAYLOAD | | |
| | MESSAGE TYPE | DIRECTION DETERMINATION REFUSAL |
| | RING ID | RING 1 |
| | SMALLEST ROUTER ID | 9::1 |
| | NUMBER OF HOPS | 0 |

FIG. 23

| DIRECTION SEARCH PACKET: P50 | | |
|---|---|---|
| IPv6 HEADER | | |
| | START POINT IP ADDRESS | IPV6 ADDRESS OF TUNNELING UNIT 12 |
| | END POINT IP ADDRESS | LOCAL LINK MULTICAST ADDRESS |
| PAYLOAD | | |
| | MESSAGE TYPE | DIRECTION SEARCH |
| | RING ID | RING 1 |

FIG. 24

| DIRECTION SETTING PACKET: P51 | | |
|---|---|---|
| IPv6 HEADER | | |
| | START POINT IP ADDRESS | C::1 |
| | END POINT IP ADDRESS | IPV6 ADDRESS OF TUNNELING UNIT 12 |
| PAYLOAD | | |
| | MESSAGE TYPE | DIRECTION SETTING |
| | RING ID | RING 1 |
| | INTERFACE NAME | IF-LEFT |
| | ADDRESS | C::1 |

IP NETWORK SYSTEM

This application is based on and claims priority from Japanese Patent Application No. 2007-269628, filed on Oct. 17, 2007, the entire contents of which are hereby incorporated by reference.

BACKGROUND OF THE INVENTION

1. Technical Field

The present disclosure relates to an IP network system, and more particularly to an IP network system capable of allowing an IP packet to reliably reach the destination if a fault occurs in a network.

2. Related Art

In an IP network system for transmitting data using Internet Protocol (IP) in the related art, a router makes two or more copies of the packet to be transmitted and transfers the copied packets to the destination via a plurality of routes, thereby enabling the packet from the source to reach the destination if a fault occurs in any of the routes. For example, JP-A-2005-218112 describes an IP network system in the related art.

FIG. 26 is a block diagram illustrating an example of an IP network system in the related art. In FIG. 26, each of hosts 1 and 4 has a communication function of transmitting a packet using Internet Protocol (IP). Each of routers 2 and 3 has a communication function and a route selection function of selecting the route to transfer the packet. The host 1 is connected to the router 2 and the routers 2 and 3 are connected to each other through a complicated network NW100, which is configured through a plurality of relays such as a switch, a router, etc. The router 3 is connected to the host 4.

FIG. 26 shows a flow of packet communication DF100 for the router 2 to transmit a packet to the router 3 via a route A in the network NW100, and also shows a flow of packet communication DF101 for the router 2 to transmit a packet to the router 3 via a route B in the network NW100.

FIG. 27 is a flowchart to describe the operation of the IP network system. First, at step S101, the host 1 generates a packet containing data such as measurement data to the host 4 as the final destination and transmits the packet to the router 2.

At step S102, the router 2 makes copies of the packet received from the host 1. For example, to transfer the packet through the two routes of the routes A and B as shown in FIG. 26, the router 2 makes copies of two packets (for example, copy packet PKT_A and copy packet PKT_B) from the packet received from the host 1.

At step S103, the router 2 transfers the two copied packets through the network NW100 to the router 3 based on preset route information.

The router 2 transfers the copy packet PKT_A to the router 3 along the route A as indicated in the flow of packet communication DF100 in FIG. 26 and transfers the copy packet PKT_B to the router 3 along the route B as indicated in the flow of packet communication DF101 in FIG. 26, for example.

The router 3 transfers the packet received from the router 2 (for example, the copy packet PKT_A or PKT_B) to the host 4.

Thus, the router makes copies of the packet from the source and transfers the copy packets through a plurality of routes. Even if a fault occurs in any of the routes and it becomes impossible to conduct packet communications, the copy packet is transferred through any other route, whereby the packet from the source host can reach the destination host.

By the way, in such an IP network system, the routes may pass through the same router depending on routing of the routers (for example, routes A and B always pass through a router X, etc.). In such a case, if a fault occurs in the router X, it becomes impossible to conduct packet communications in all routes.

To prevent a situation in which it becomes impossible to conduct packet communications in all routes if a fault occurs in one router, it is necessary to make setting so that the routes do not pass through the same router. Then, setting of routing of all routers is previously designed strictly and then a routing table of all routers is managed and set.

However, in the method of setting routing of the routers to prevent the routes from passing through the same router, there is a problem in that routing of the routers must be set again each time the system configuration is changed. Further, such a method also involves a problem of taking a long time in maintenance because the routing table of all routers must be managed.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an IP network system in which a packet can reliably arrive at the destination if a fault occurs in any route.

According to one or more aspects of the present invention, there is provided an IP network system. The IP network system includes: a plurality of relays making up a ring network; a source host for transmitting a packet and connected to the ring network; and a destination host which conducts a packet communication with the source host through the ring network. Each of the relays is operable to transfer received packets containing a transfer direction information to the destination host through a right-handed route of the ring network and through a left-handed route of the ring network, based on the transfer direction information.

According to one or more aspects of the present invention, the IP network further includes: a plurality of tunneling units connected to the ring network. The tunneling units includes: a source tunneling unit connected to the source host; and a destination tunneling unit connected to the destination host. The source tunneling unit is operable to: a) perform capsulation on a packet from the source host to generate a tunnel packet; b) copy the tunnel packet to generate a copy tunnel packet; c) add the transfer direction information to the copy tunnel packet and the tunnel packet; and d) transmit the tunnel packet and the copy tunnel packet to which the transfer direction information is added, to the right-handed route and the left-handed route of the ring network.

According to one or more aspects of the present invention, each of the relays is operable to: a) perform capsulation on a packet from the source host to generate a tunnel packet; b) copy the tunnel packet to generate a copy tunnel packet; c) add the transfer direction information to the tunnel packet and the copy tunnel packet; and d) conduct a tunneling communication in the ring network.

According to one or more aspects of the present invention, each of the tunneling units includes: a communication section for conducting the packet communication; a storage section for storing at least one network address of the relays connected to the tunneling unit and the source and destination hosts; and a computation control section. The computation control section is operable to: a) perform the capsulation on the packet from the source host to generate the tunnel packet; b) copy the tunnel packet to generate a copy tunnel packet; c) add the transfer direction information and a network address of a destination relay to the copy tunnel packet and the tunnel packet; d) control the communication section to transfer the copy tunnel packet and the tunnel packet to the destination tunneling unit through any route of the ring network; e) perform decapsulation on the tunnel packet received by the destination tunneling to reproduce the packet before subjected to the capsulation; f) control the communication section to transfer the reproduced packet to the destination host based on information about the destination host contained in the reproduced packet; and g) store the reproduced packet in the storage section.

According to one or more aspects of the present invention, if the reproduced packet is already stored in the storage section, the computation control section is operable to discard the reproduced packet.

According to one or more aspects of the present invention, each of the relays includes: a communication section for conducting the packet communication; a storage section for storing at least one network address of other relays connected to the relay and the source and destination hosts; and a computation control section that analyzes the received packets containing the transfer direction information and information about the destination host, and then controls the communication section to transfer the packets to any route of the ring network, based on the transfer direction information and the information about the destination host.

According to one or more aspects of the present invention, the computation control section is operable to: a) perform the capsulation on the packet from the source host to generate the tunnel packet; b) copy the tunnel packet to generate a copy tunnel packet; c) add the transfer direction information and a network address of a destination relay to the copy tunnel packet and the tunnel packet; d) control the communication section to transfer the copy tunnel packet and the tunnel packet to the destination relay through any route of the ring network; e) perform decapsulation on the tunnel packet received by the destination relay to reproduce the packet before subjected to the capsulation; f) control the communication section to transfer the reproduced packet to the destination host based on the information about the destination host contained in the reproduced packet; and g) store the reproduced packet in the storage section.

According to one or more aspects of the present invention, each of the relays transmits a direction setting packet for setting a transfer direction to a different relay connected to the same ring network and shares the transfer direction with the different relay.

According to one or more aspects of the present invention, each of the relays includes: a communication section for conducting the packet communication; a storage section for storing at least one network address of other relays connected to the relay and the source and destination hosts; and a section for transmitting the direction setting packet to the different relay connected to the same ring network and setting one communication interface for receiving the direction setting packet from the different relay as an interface for transmitting a packet in the left-handed direction and setting another communication interface as an interface for transmitting a packet in the right-handed direction.

According to the invention, each relay of the router, the tunneling unit, etc., performs capsulation on the packet from the source host to copy the tunnel packet and transmits the tunnel packet in the right-handed direction and the left-handed direction in the ring network made up of the relays. Then, the relays transfer the received tunnel packet in the right-handed direction and the left-handed direction. Therefore, the packet can reliably arrive at the destination host if a fault occurs in any route.

Other aspects and advantages of the invention will be apparent from the following description, the drawings and the claims.

BRIEF DESCRIPTION OF THE DRAWINGS

The above and other aspects, features and advantages of the present invention will be more apparent from the following more particular description thereof, presented in conjunction with the following drawings wherein:

FIG. 4 is a schematic representation showing an example of tunnel creation information stored in a tunnel creation information storage section;

FIG. 5 is a schematic representation showing an example of transferred packet information stored in a packet information storage section;

FIG. 13 is a drawing of an example of a packet format used in the IP network system;

FIG. 20 is a drawing of the packet format of the direction determination packet;

FIG. 21 is a drawing of the packet format of a direction determination refusal packet;

FIG. 23 is a drawing of the packet format of a direction search packet;

FIG. 24 is a drawing of the packet format of a direction setting packet;

DETAILED DESCRIPTION OF EXEMPLARY EMBODIMENTS

In an IP network system according to exemplary embodiments of the present invention, hosts conduct packet communications through a ring network mainly made up of relays having a routing function such as routers. However, to simplify the description, it is assumed that a plurality of routers make up a ring network hereinafter.

Exemplary embodiments of the present invention will be described with reference to the accompanying drawings.

Figure 1:
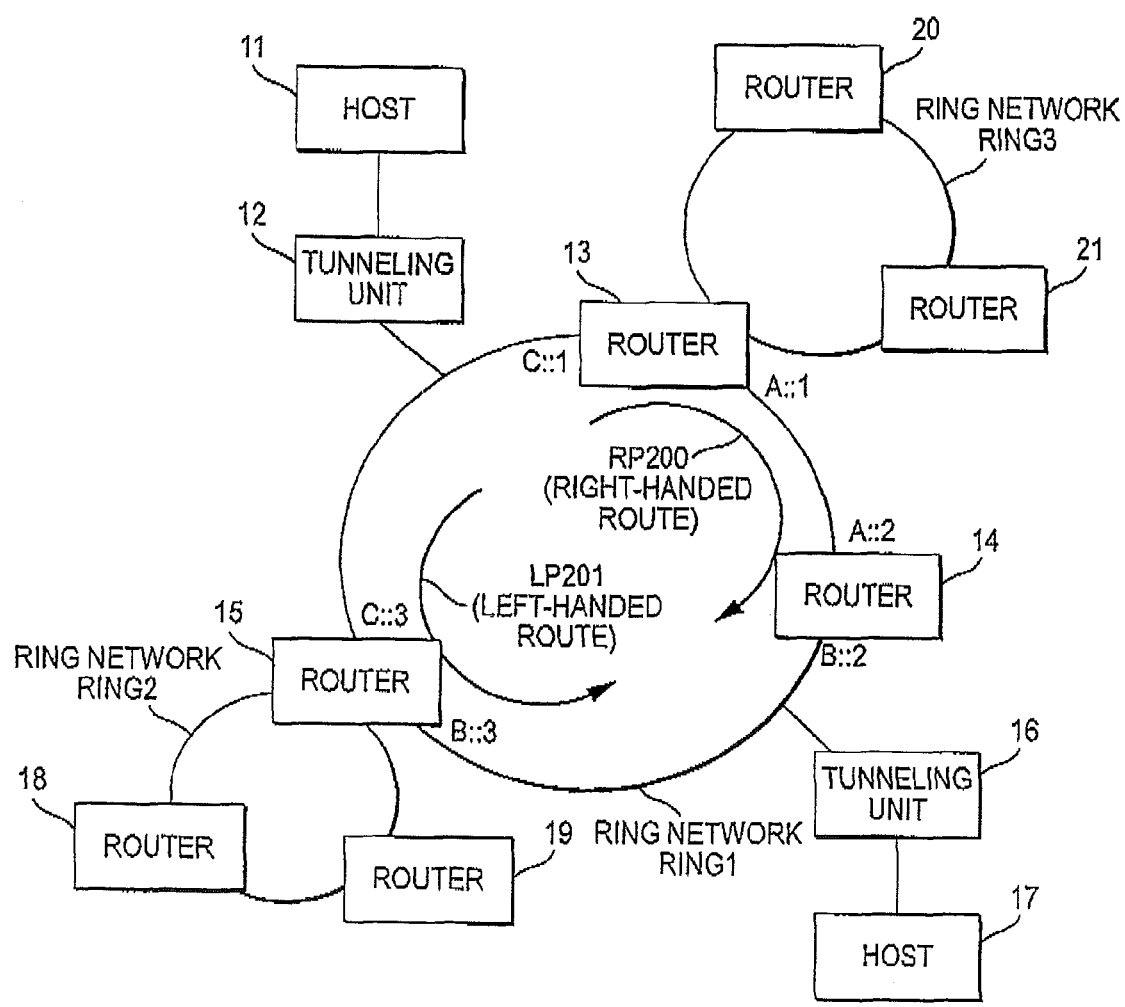
FIG. 1 is a block diagram showing an IP network system according to an embodiment of the present invention.

FIG. 1 is a block diagram showing an IP network system according to an embodiment of the present invention. In FIG. 1, a host 11 is connected to a tunneling unit 12 and the tunneling unit 12 is connected to routers 13 and 15. A router 14 is connected to the routers 13 and 15 and a tunneling unit 16. The tunneling unit 16 is connected to the routers 14 and 15 and a host 17. A router 18 is connected to the router 15 and a router 19, and a router 20 is connected to the router 13 and a router 21.

The routers 13 to 15 make up a first ring network RING1, the routers 15, 18, and 19 make up a second ring network RING2, and the routers 13, 20, and 21 make up a third ring network RING3.

The hosts 11 and 17 have a communication function of transmitting a packet mainly using Internet Protocol Version 6 (IPv6).

The tunneling units 12 and 16 have a communication function, a tunnel packet generation function, a tunnel packet release function, a packet copy function and a transfer determination function. The tunnel packet generation function adds an IP header and various expansion headers to each packet mainly from the hosts 11 and 17, performs capsulation processing, and generates a tunnel packet for tunneling communications. The tunnel packet release function performs decapsulation processing on the tunnel packet and extracts a packet. The packet copy function copies the packet. The transfer determination function determines whether or not the received packet is already transferred.

The routers 13 to 15 and 18 to 21 have a communication function and a route selection function of selecting the optimum route to transfer a packet.

A communication section of each router has a plurality of communication interfaces and two communication interfaces are connected to the same ring network and are each assigned an IPv6 address. In the embodiment, it is assumed that IPv6 addresses "A::1" and "C::1" are assigned to the router 13, IPv6 addresses "A::2" and "B::2" are assigned to the router 14, and IPv6 addresses "B::3" and "C::3" are assigned to the router 15.

Further, FIG. 1 shows "right-handed route RP200" for transferring a packet to the tunneling unit 16 through the routers 13 and 14 in the ring network and "left-handed route LP201" for transferring a packet to the tunneling unit 16 through the router 15.

The route direction for transferring a packet from the tunneling unit 12 to the tunneling unit 16 through the routers 13 and 14 is referred to as the "right-handed direction" and the route direction for transferring a packet from the tunneling unit 12 to the tunneling unit 16 through the router 15 is referred to as the "left-handed direction". The packet transferred in the right-handed direction is referred to as "right-handed packet" and the packet transferred in the left-handed direction is referred to as "left-handed packet."

In FIG. 1, the system is described using the routers 13 to 15 and 18 to 21, but a relay having a routing function may be used. In the description, each ring network is made up of the routers, but relays (e.g., switches or bridges) each having a routing function may make up a ring network.

Figure 2:
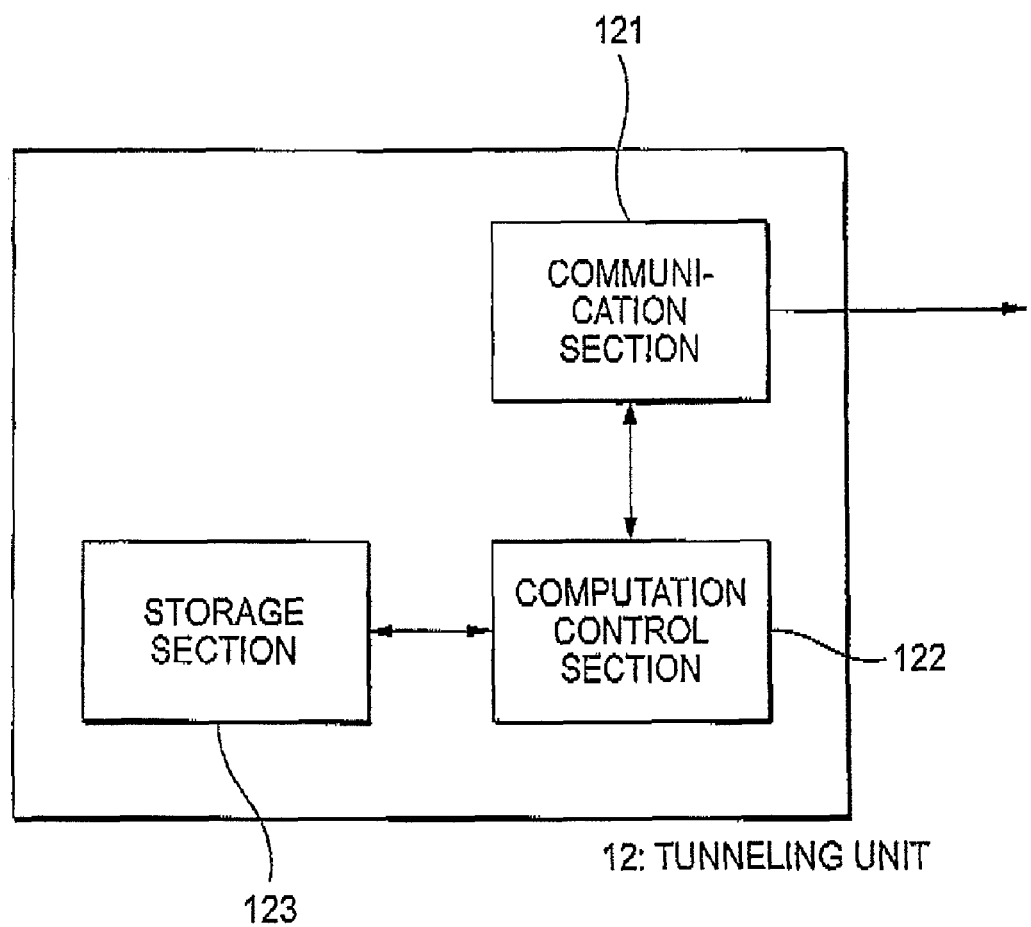
FIG. 2 is a block diagram showing the configuration of a tunneling unit 12 in FIG. 1.

FIG. 2 is a block diagram to show a specific configuration example of the tunneling unit 12 in FIG. 1. In FIG. 2, a communication section 121 is connected to a computation control section 122, which is connected to a storage section 123. The communication section 121 conducts communications mainly with the host 11 and the routers 13 and 15. The computation control section 122 controls the operation of each section and a Central Processing Unit (CPU) may be used as the computation control section 122, for example. The storage section 123 stores an Operating System (OS) and a program, route information, various pieces of information, etc., required for operation as the tunneling unit. The tunneling unit 16 is also configured like the tunneling unit 12.

Figure 3:
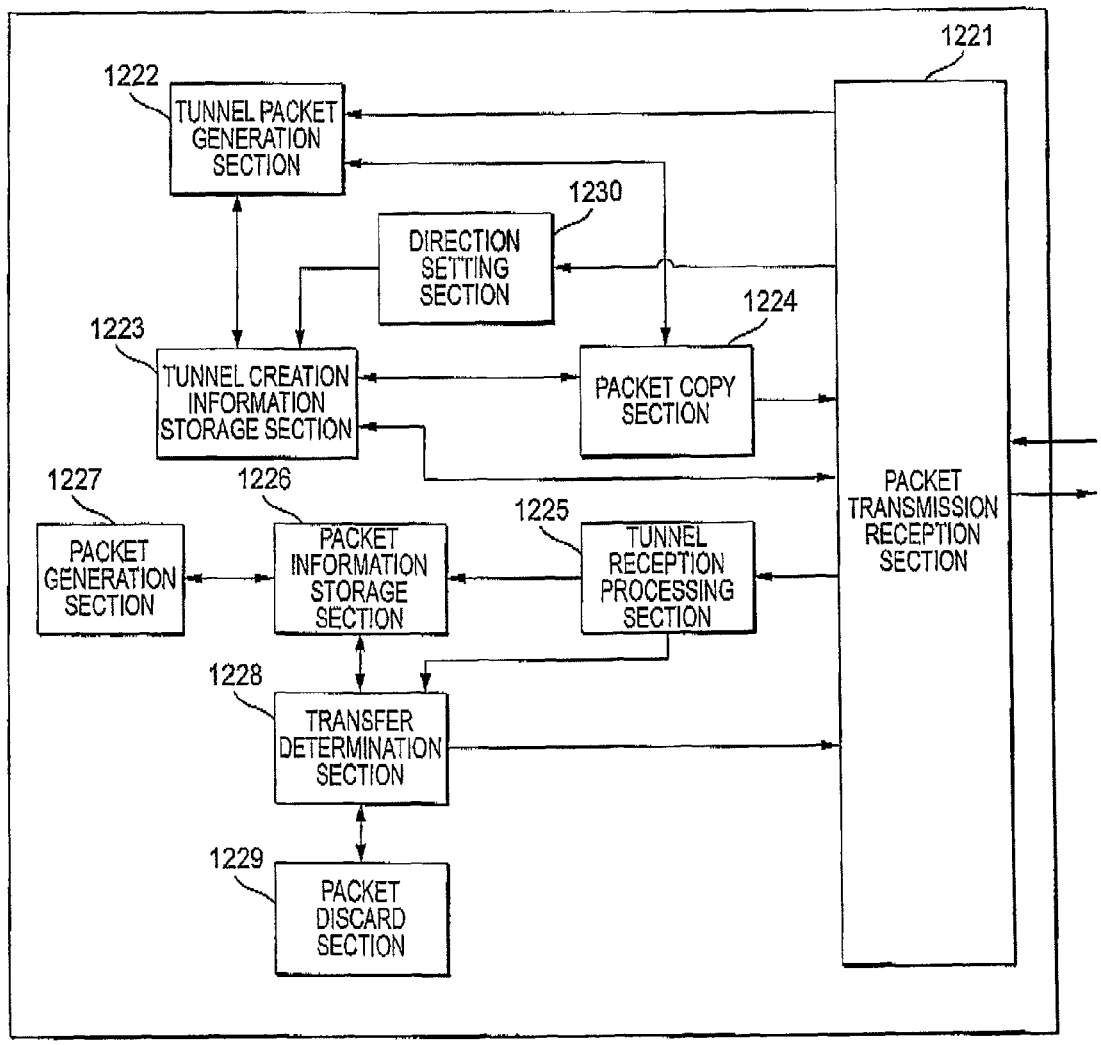
FIG. 3 is a functional block diagram of a computation control section 122 forming a part of the tunneling unit in FIG. 2.

FIG. 3 is a functional block diagram of the computation control section 122 forming a part of the tunneling unit in FIG. 2. A packet transmission-reception section 1221 transmits and receives mainly packets such as a packet from the host 11, 17 and a tunnel packet. A tunnel packet generation section 1222 performs capsulation processing of adding transfer direction information indicating the right-handed or left-handed direction of the ring network to a packet from the host 11 based on tunnel creation information stored in a tunnel creation information storage section 1223 and adding an IP header and various extension headers. Then, the tunnel packet generation section 1222 generates a tunnel packet for conducting tunneling communications between the tunneling units.

The tunnel creation information storage section 1223 stores tunnel creation information to generate a tunnel packet and route information for transferring a tunnel packet from the tunneling unit 12 to the destination host 17. A packet copy section 1224 makes a copy of a tunnel packet and sets the transfer direction information of the tunnel packet copy to the opposite direction (for example, left-handed direction) to the transfer direction information of the source tunnel packet (for example, right-handed direction).

A tunnel reception processing section 1225 analyzes the tunnel packet received by the packet transmission-reception section 1221 from each router and stores "tunnel packet information" containing the destination, the source, packet information before capsulation or the like in a packet information storage section 1226. The packet information storage section 1226 stores the "tunnel packet information" analyzed by the tunnel reception processing section 1225 and "already-transferred packet information" concerning a packet already transferred from the tunneling unit 12 to the host of the final destination.

A packet generation section 1227 performs decapsulation processing based on the tunnel packet information stored in the packet information storage section 1226 to reproduce the packet before capsulated, in other words, the packet transmitted from the source host. Based on whether or not the same packet as the tunnel packet received from the source host is stored in the packet information storage section 1226, a transfer determination section 1228 determines whether or not the packet already subjected to decapsulation processing and reproduced has been transferred to the host of the final destination. If the packet is not yet transferred, the reproduced packet is transferred to the host of the final destination.

If the same packet as the tunnel packet received from the source host is stored in the packet information storage section 1226, a packet discard section 1229 discards the packets of the tunnel packet, the reproduced packet, etc. A direction setting section 1230 acquires and sets the transfer destination address of a right-handed packet or a left-handed packet.

FIG. 4 is a schematic representation to represent an example of the tunnel creation information stored in the tunnel creation information storage section 1223. The tunnel creation information storage section 1223 of the tunneling unit 12, 16 has a plurality of "route information" fields to create a tunnel packet, as shown in FIG. 4.

Each of the route information fields has fields of "destination address" (for example, "IPv6 address of host 17") storing the final destination of the tunnel packet, "tunnel end point address" (for example, "IPv6 address of tunneling unit 16") storing the destination of tunneling communications, "ring ID" (for example, "RING1") storing identification information of each ring network, "packet ID" (for example, "PKT0") storing identification information of the tunnel packet, "right-handed packet transfer destination" (for example, "IPv6 address "C::1" of router 13") storing the address of the router for transferring a right-handed packet or the like, "left-handed packet transfer destination" (for example, "IPv6 address "C::3" of router 15") storing the address of the router for transferring a left-handed packet or the like, and so forth.

FIG. 5 is a schematic representation to show an example of already-transferred packet information stored in the packet information storage section 1226. As shown in FIG. 5, the packet information storage section 1226 of the tunneling unit 12, 16 has a plurality of "already-transferred packet information" fields and the already-transferred packet information has fields of "time stamp" (e.g., "20070910-22:30:10.113591") storing the time at which the tunnel packet was received through the ring network from the tunneling unit at the start point of tunnel communications, "tunnel start point address" (e.g., "IPv6 address of tunneling unit 12") storing the address of the tunneling unit at the start point of the received tunnel packet, "packet ID" (for example, "PKT0") storing identification information of the packet transferred to the final destination host, and so forth.

Figure 6:
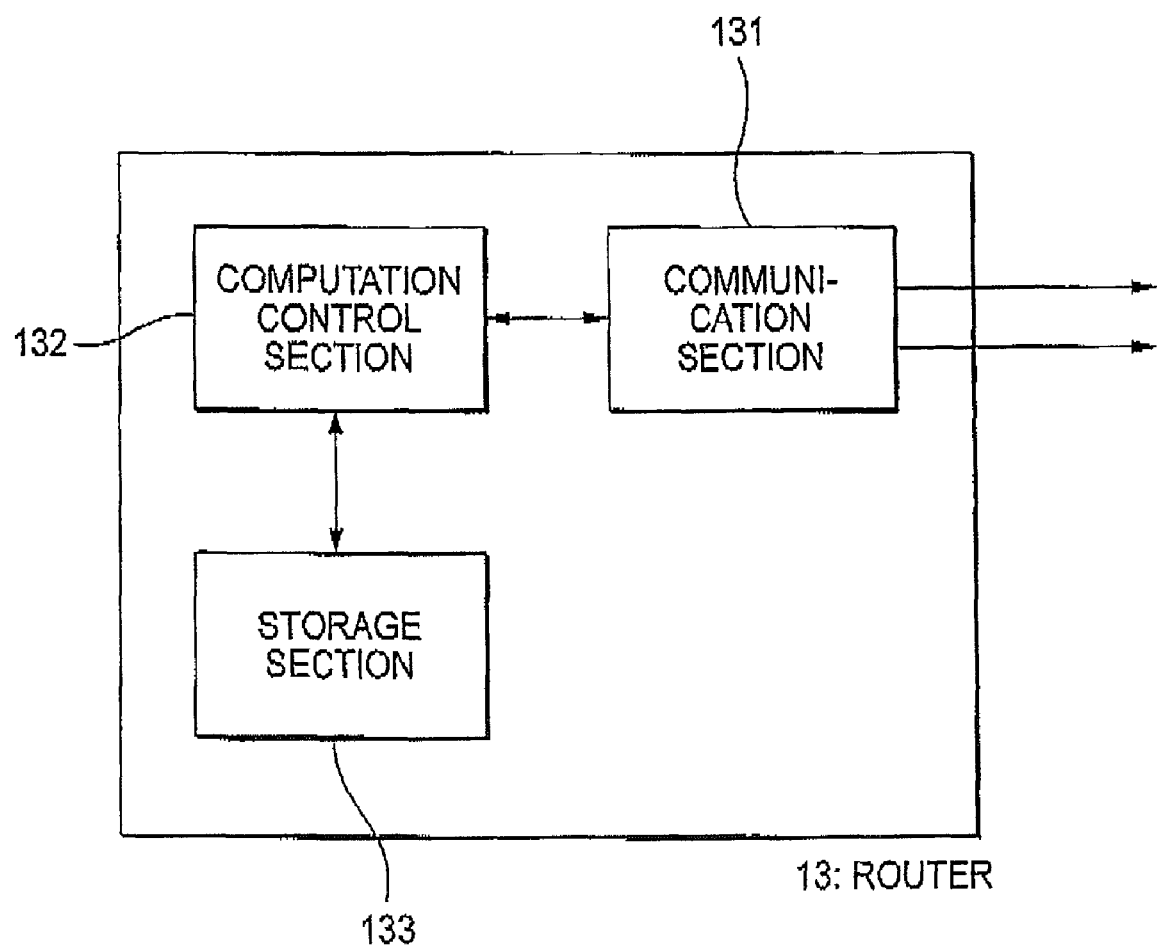
FIG. 6 is a block diagram of the configuration of a router 13 in FIG. 1.

FIG. 6 is a block diagram of the configuration of the router 13 in FIG. 1. In FIG. 6, a communication section 131 is connected to a computation control section 132, which is connected to a storage section 133. The communication section 131 has a plurality of communication interfaces not shown (e.g., communication interfaces IF130, IF131, etc.,) and conducts communications mainly with the tunneling unit 12 and the router 14. The computation control section 132 mainly is a CPU, etc., and controls the operation of each section. The storage section 133 stores an OS and a program, route information, various pieces of information, etc., required for operation as the router. Each of the routers 14, 15, and 18 to 21 is also configured like the router 13.

For example, the operation of transmitting the right-handed packet and receiving the left-handed packet and the operation of transmitting a left-handed packet and receiving a right-handed packet are assigned to the communication interfaces of the communication section 131 of the router 13.

Figure 7:
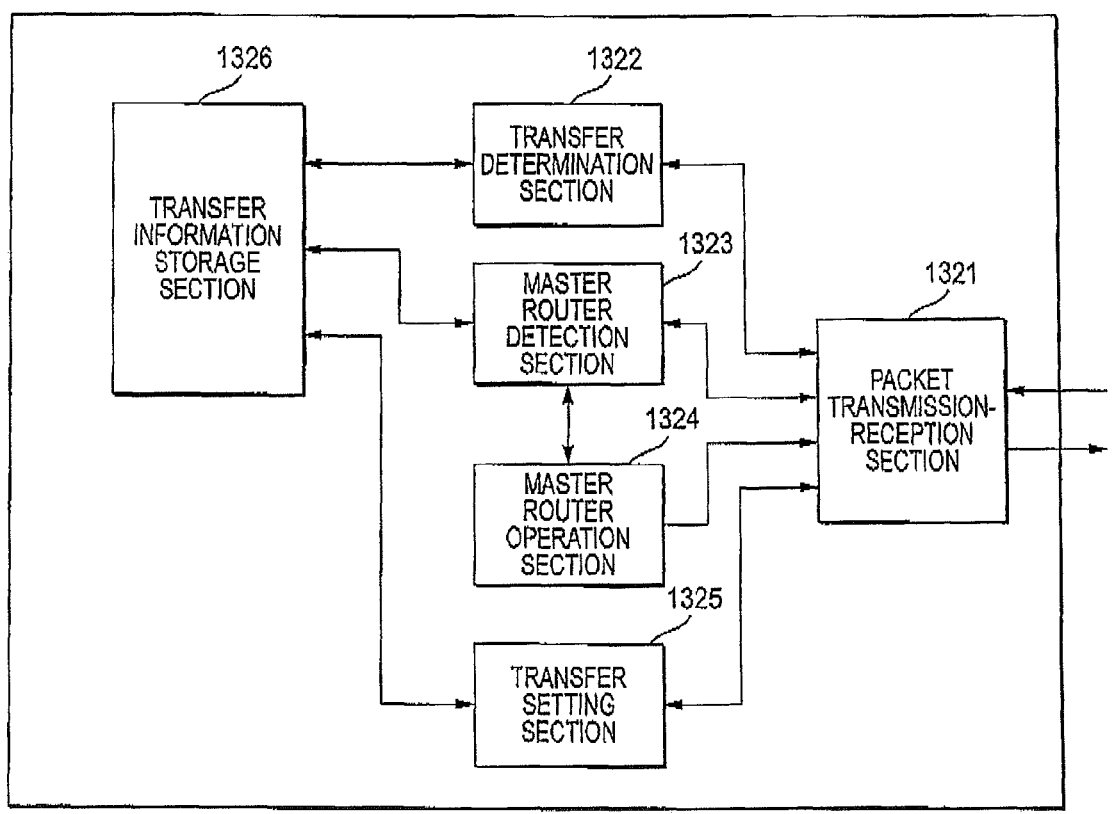
FIG. 7 is a functional block diagram of a computation control section 132 forming a part of the router 13 in FIG. 6.

FIG. 7 is a functional block diagram of the computation control section 132 forming a part of the router 13 in FIG. 4. A packet transmission-reception section 1321 transmits and receives mainly a packet of a tunnel packet, etc. A transfer determination section 1322 mainly determines which of the right-handed direction and the left-handed direction the tunnel packet received from the tunneling unit 12 is to be transferred in. A master router detection section 1323 searches for and detects a master router. A master router operation section 1324 causes the router to operate as the master router.

A transfer setting section 1325 sets the operation of each communication interface in the communication section 131 of the router and transmits a "direction determination packet" to set and share the packet transfer direction in the ring network to a different router. A transfer information storage section 1326 stores "transfer information" and "ring network information". The transfer information contains route information to the host and a different router, set information to set the network addresses of the routers, the tunneling units for transferring the right-handed packet and the left-handed packet and the operation of each communication interface of the communication section 131, or the like. The ring network information contains the master router of the ring network to which the router is connected, the transfer destination, or the like.

The transfer information in the transfer information storage section 1326 contains the interface names of the communication interfaces and information to define each communication interface as to whether to transmit and receive a right-handed packet or a left-handed packet. The transfer information contains information for setting interface name "IF-RIGHT" for the communication interface for transmitting a right-handed packet and information for setting interface name "IF-LEFT" for the communication interface for transmitting a left-handed packet, for example. In this case, the right-handed packet is received at IF-LEFT and is transferred from IF-RIGHT, and the left-handed packet is received at IF-RIGHT and is transferred from IF-LEFT.

Figure 8:
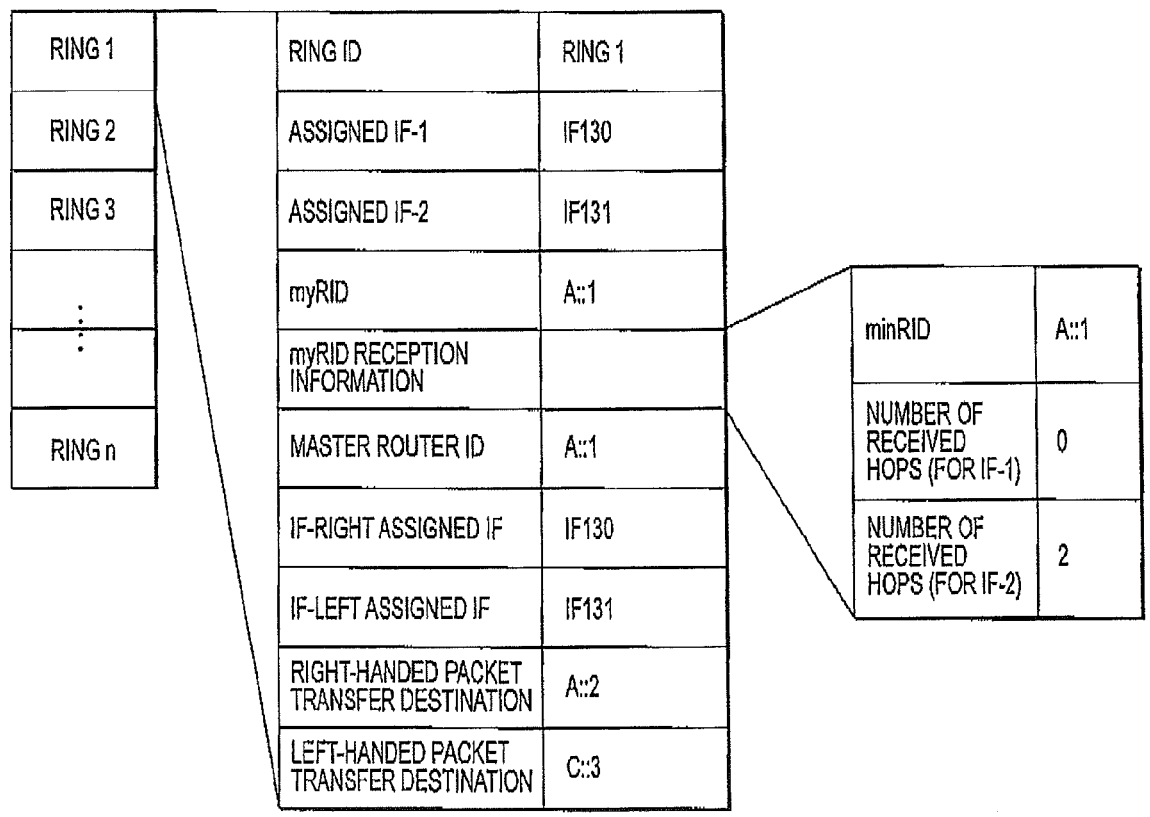
FIG. 8 is a schematic representation showing an example of ring network information stored in a transfer information storage section of each router.

FIG. 8 is a schematic representation showing an example of the ring network information stored in the transfer information storage section 1326 of each router. As shown in FIG. 8, the transfer information storage section 1326 of each of the routers 13 to 15 has a plurality of "ring" fields of transfer information of each ring network made up of the routers.

Each of the "ring" fields has: "ring ID" (e.g., "RING1") storing identification information of the ring network; "assigned IF-1" (e.g., "communication interface IF130") storing first communication interface information assigned to the ring network; "assigned IF-2" (e.g., "communication interface IF131") storing second communication interface information assigned to the ring network; "myRID" storing identification information of the router used in the ring network, and especially storing the smallest address of the IPv6 addresses set in the assigned IF-1 and IF-2; "minRID reception information" storing information about the router having the identification information of the smallest value in the ring network used to select the master router; "master router ID" (e.g., "A::1") storing identification information of the master router, and so forth.

As the router ID of identification information of each router (which will be hereinafter called "RID"), the IPv6 address assigned to the router is used. If a plurality of IPv6 addresses are assigned to the router, the newest IPv6 address is used as the RID. However, the operator may set any desired RID.

The "ring" field further has: "IF-RIGHT assigned IF" (e.g., "IF130") storing communication interface information setting "IF-RIGHT" for transmitting the right-handed packet; "IF-LEFT assigned IF" (e.g., "IF131") storing communication interface information setting "IF-LEFT" for transmitting the left-handed packet; "right-handed packet transfer destination" (e.g., "IPv6 address "A::2" of router 14") storing the address of the router, the tunneling unit, etc., for transferring a right-handed packet; "left-handed packet destination" (e.g., "IPv6 address "C::3" of router 15") storing the address of the router, the tunneling unit, etc., for transferring a left-handed packet, and so forth.

The "minRID reception information" has: fields of "min-RID" (e.g., "A::1") storing the identification information of the router having the smallest value in the ring network recognized by the router; "number of received hops (for IF-1)" (e.g., "0") storing the number of times that an advertising packet received by the interface IF-1 has been transferred; "number of received hops (for IF-2)" (e.g., "2") storing the number of times that an advertising packet received by the interface IF-2 has been transferred, and so forth.

It is assumed that the advertising packet is a packet for reporting minRID (identification information of the router having the smallest value in the ring network recognized by each router) stored in the transfer information storage section 1326 to select the master router from among the routers making up the ring network. Also, it is assumed that the router having the identification information of the smallest value in the ring network is selected as the master router.

Each router may have two or more communication interfaces and can take part in one or more ring networks. In this case, the information required for transfer varies from one ring to another and thus the transfer information storage section has one or more "ring" fields.

The operation of the IP network system of the present invention will be discussed with a schematic representation showing a packet communication flow (FIG. 9), a flowchart of FIG. 10, and packet format examples used in the IP network system shown in FIGS. 11 to 13. For simplicity, the operation for the hosts 11 and 17 to conduct packet communications through the ring network RING1 made up of the routers 13 to 15 will be discussed.

Figure 9:
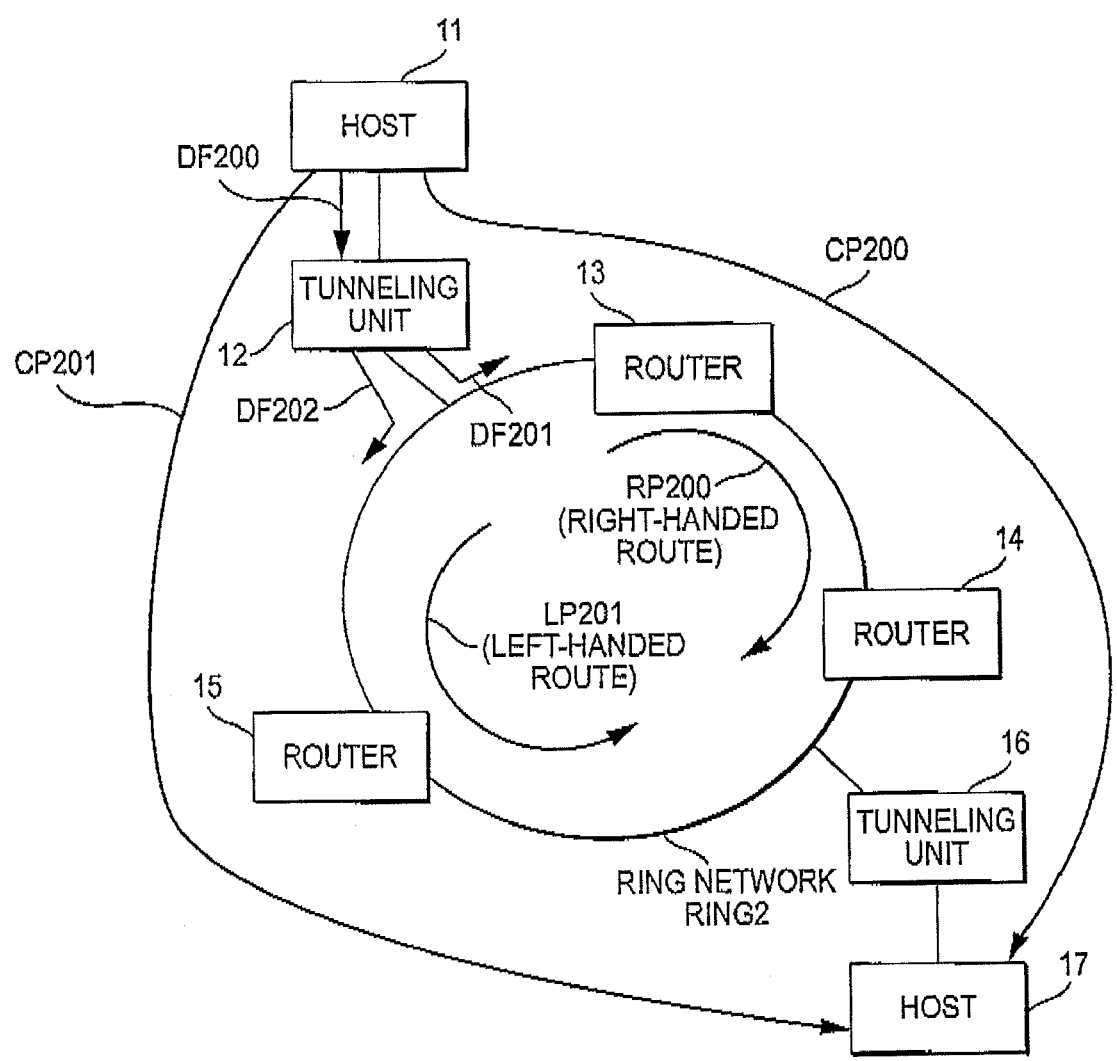
FIG. 9 is a schematic representation showing a packet communication flow in the operation of the IP network system of the present invention.

In FIG. 9, packet communication DF200 indicates a flow for the host 11 to transmit a packet to the tunneling unit 12. Packet communication DF201 indicates a flow for the tunneling unit 12 to transmit a packet to the router 13. Packet communication DF202 indicates a flow for the tunneling unit 12 to transmit a packet to the router 15. Communication route CP200 indicates a flow in which a packet arrives at the host 17 through the tunneling unit 12, the routers 13 and 14, and the tunneling unit 16 from the host 11. Communication route CP201 indicates a flow in which a packet arrives at the host 17 through the tunneling unit 12, the router 15, and the tunneling unit 16 from the host 11.

Figure 10:
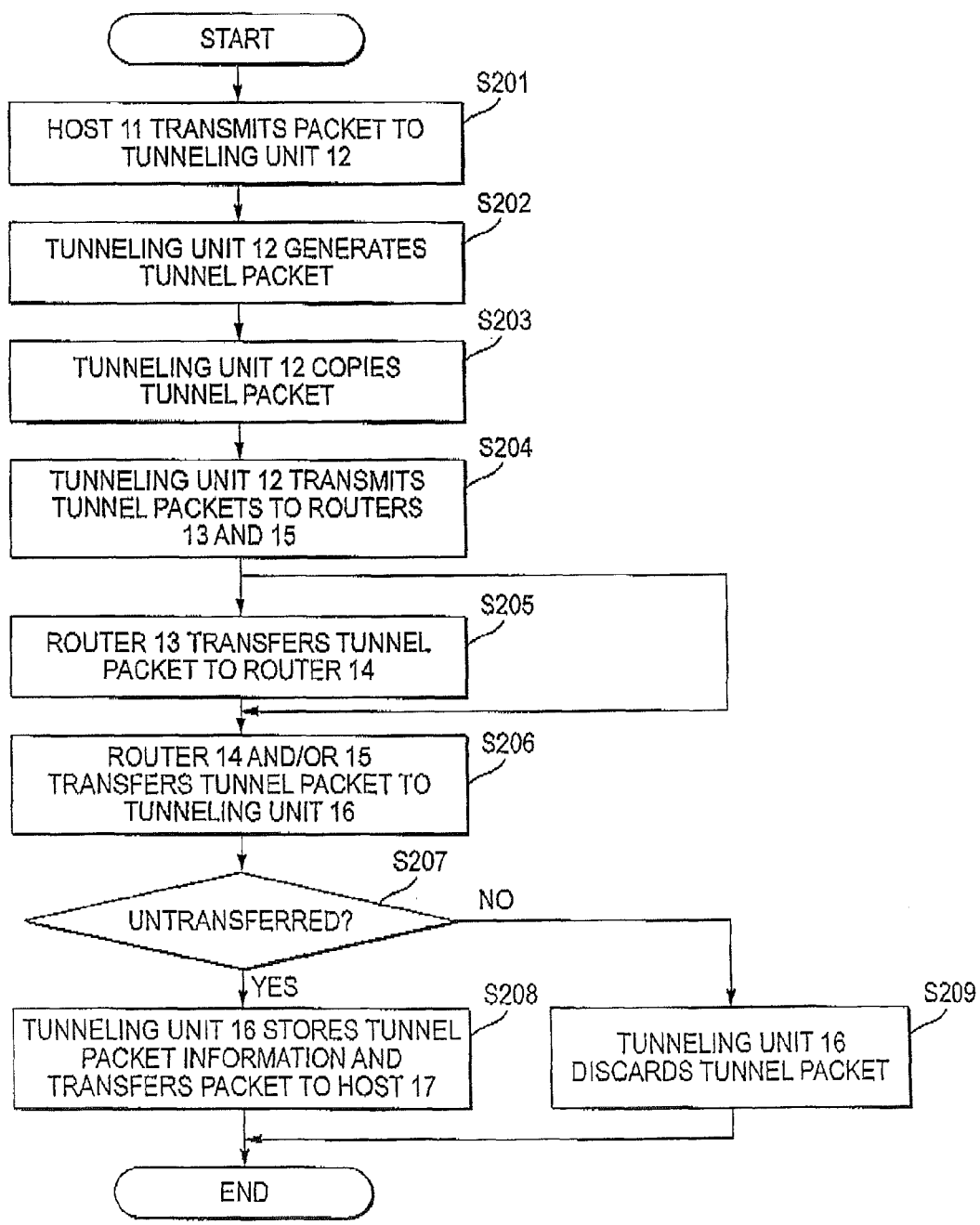
FIG. 10 is a flowchart to describe the operation of the IP network system of the present invention.

At step S201 in FIG. 10, a computation control section (not shown) of the host 11 starts the OS stored in a storage section (not shown), then reads and executes a program in the OS to control the whole host 11, then generates a packet containing measurement data destined for the host 17 as the final destination, and then controls a communication section to transmit the packet to the tunneling unit 12. The host 11 transmits a packet (e.g., packet P10 in FIG. 11) to the tunneling unit 12, for example, as shown in the flow of the packet communication DF200 in FIG. 9.

Figure 11:
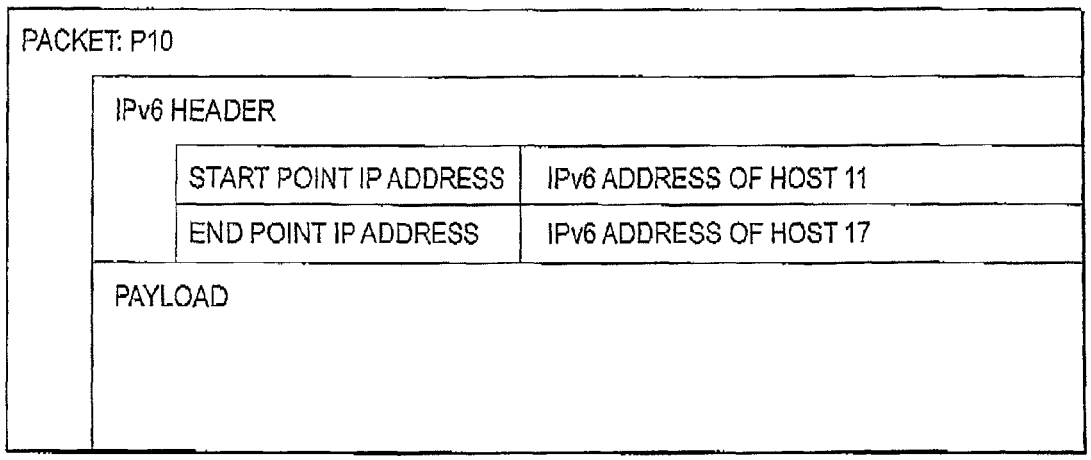
FIG. 11 is a drawing of an example of a packet format used in the IP network system.

FIG. 11 is a drawing of a format example of the packet P10 generated by the host 11. The packet P10 has fields of an IPv6 header, payload, etc. The value of the start point IP address (for example, IPv6 address of host 11) and the value of the end point IP address (for example, IPv6 address of host 17) are set in the IPv6 header, and data such as application data is stored in the payload.

At step S202, the computation control section 122 of the tunneling unit 12 starts an OS stored in the storage section 123, then reads and executes a stored program in the OS to control the whole tunneling unit 12, and then performs capsulation processing on the packet from the host 11 to generate a tunnel packet. The operation for the computation control section 122 of the tunneling unit 12 to read and execute a program stored in the storage section 123 to control the sections of the tunneling unit 12 is similar to that in any other tunneling unit and therefore will not be discussed again.

The tunnel packet generation section 1222 of the computation control section 122 searches for the tunnel end point address of tunneling communications (for example, IPv6 address of tunneling unit 16) used until the packet arrives at the destination host 17 from the tunneling unit 12 based on the packet P10 and the tunnel creation information (for example, "route 1" in FIG. 4) from the host 11, for example, and adds the tunnel end point address to the packet P10 to generate a tunnel packet P20. The tunnel packet generation section 1222 also creates the packet ID of the identifier of the tunnel packet (for example, "PKT0") and adds the packet ID to the tunnel packet P20.

Figure 12:
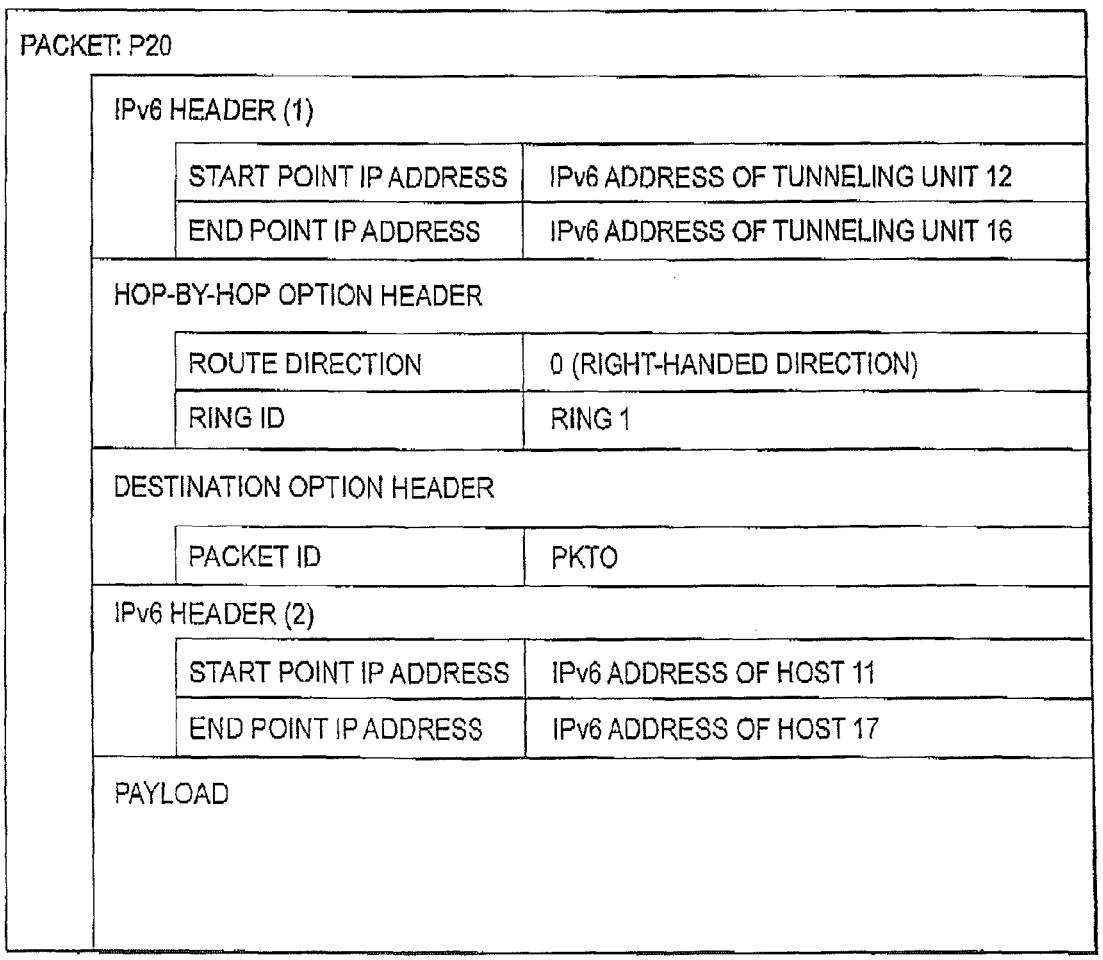
FIG. 12 is a drawing of an example of a packet format used in the IP network system.

FIG. 12 is a drawing of a format example of the packet P20 generated by the tunnel packet generation section 1222. The tunnel packet P20 is provided by adding an IPv6 header (1), a hop-by-hop option header, and a destination option header to the packet P10 shown in FIG. 11.

The IPv6 header (1) has fields of "start point IP address" storing the network address of the source tunneling unit, "end point IP address" storing the network address of the destination tunneling unit, and so forth. The hop-by-hop option header has fields of "route direction" storing the right-handed direction or the left-handed direction in the ring network and "ring ID" storing the identifier of the ring network. The destination option header has a "packet ID" field storing the identifier of the tunnel packet. FIG. 12 shows the IPv6 header of the packet P10 in the packet P20 as IPv6 header (2).

Specifically, the tunnel packet generation section 1222 generates the tunnel packet P20 based on the packet P10 and the tunnel packet creation information as in FIG. 12. The tunnel packet sets the value of the start point IP address of the IPv6 header (1) (e.g., "IPv6 address of tunneling unit 12"), the value of the end point IP address (e.g., "IPv6 address of tunneling unit 16"), the value of the route direction of the hop-by-hop option header (e.g., "0 (right-handed direction)"), the ring ID (e.g., "RING1"), and the value of the packet ID of the destination option header (e.g., "PKT0")

At step S203, the packet copy section 1224 of the computation control section 122 of the tunneling unit 12 makes a copy of the tunnel packet (for example, packet P21 in FIG. 13) based on the generated tunnel packet (for example, packet P20 in FIG. 12) and the tunnel packet creation information.

To make a copy of the tunnel packet, the tunnel packet generation section 1222 sets the value of the route direction of the hop-by-hop option header to the opposite direction (for example, "1 (left-handed direction)") to the route direction of the source tunnel packet (for example, packet P20 in FIG. 12) as in the tunnel packet P21 in FIG. 13, for example.

At step S204, the packet transmission-reception section 1221 of the computation control section 122 of the tunneling unit 12 transmits tunnel packets to the routers 13 and 15 based on the ring ID, the route direction, and the end point IP address set in each of the tunnel packets and the tunnel packet creation information in the storage section 123.

Specifically, the packet transmission-reception section 1221 of the computation control section 122 searches for route information about RING1 in the tunnel packet creation information based on the ring ID (RING1) set in the tunnel packet P20, P21.

The packet transmission-reception section 1221 transmits the packet P20 to the router 13 and the packet P21 to the router 15 based on the right-handed packet transfer destination (address of router 13 "C::1") and the left-handed packet transfer destination (address of router 15 "C::3") of the route information in FIG. 4, the route direction (right-handed) of the tunnel packet P20, the route direction (left-handed) of the tunnel packet P21, and the end point IP address (for example, IPv6 address of the tunneling unit 16).

The operation for the computation control section 122 of the tunneling unit 12 to read and execute a program stored in the storage section 123 to control the sections of the tunneling unit is similar to that in any other tunneling unit and therefore will not be discussed again. If the tunneling unit 12 transfers the tunnel packet to the router 13, the process goes to step S205; if the tunneling unit 12 transfers the tunnel packet to the router 15, the process goes to step S206.

At step S205, the computation control section 132 of the router 13 starts an OS stored in the storage section 133, then reads and executes a stored program in the OS to control the whole router 13, and then transfers the tunnel packet received from the tunneling unit 12 to the router 14 based on the route direction of the tunnel packet, the end point IP address, and the transfer information in the transfer information storage section 1326.

Specifically, the router 13 receives the tunnel packet P20 through the IF-LEFT assigned interface IF131 of the communication section 131. The transfer determination section 1322 of the computation control section 132 controls the IF-RIGHT assigned interface IF130 based on the route direction of the tunnel packet P20 (for example, right-handed direction), the end point IP address (for example, IPv6 address of the tunneling unit 16), and the right-handed packet transfer destination of the transfer information (for example, address of the router 14 "A::2"), and transfers the tunnel packet received from the tunneling unit 12 (for example, P20) to the router 14.

The operation for the computation control section 132 of the router 13 to read and execute a program stored in the storage section 133 to transfer the tunneling packet is similar to that in any other router and therefore will not be discussed again.

At step S206, the transfer determination section of the computation control section (not shown) of the router 14 and/or 15 transfers the tunnel packet received from the router 13 or the tunneling unit 12 to the tunneling unit 16 based on the value of the route direction header of the received tunnel packet (for example, tunnel packet P20, P21), the end point IP address (for example, IPv6 address of the tunneling unit 16), and the "right-handed packet transfer destination" or "left-handed packet transfer destination" of the transfer information previously stored in the transfer information storage section (not shown).

Thus, the tunnel packet transmitted from the tunneling unit 12 is transferred to the tunneling unit 16 through the ring network made up of the routers 13 to 15.

By the way, it is assumed that the tunneling unit 16 receives the tunnel packet P20 transferred from the router 14 prior to the tunnel packet P21 transferred from the router 15.

At step S207, the tunnel reception processing section of the computation control section of the tunneling unit 16 analyzes the tunnel packet (for example, tunnel packet P20) received through the routers 13 and 14 or the router 15, and the transfer determination section determines whether or not the received tunnel packet (for example, P20) has been transferred to the host 17 based on the already-transferred packet information stored in the packet information storage section. If the tunnel packet received by the tunneling unit 16 is not yet transferred to the host 17, the process goes to step S208.

If the same tunnel packet is not stored in the packet information storage section, for example, based on the start point address (for example, tunneling unit 12) of the tunnel packet (for example, P20) and the packet ID of the destination option header (for example, PKT0), the transfer determination section of the tunneling unit 16 determines that the tunnel packet is not yet transferred to the host 17.

At step S208, the tunnel reception processing section of the computation control section of the tunneling unit 16 analyzes the tunnel packet received through the routers 13 and 14 or the router 15, and stores the data transmitted from the host 11 stored in the payload field of the tunnel packet, the start point address of the IPv6 (1) header (for example, "IPv6 address of the tunneling unit 12"), the value of the packet ID of the destination option header (for example, "PKT0"), the time at which the tunnel packet was received, for example, in the packet information storage section. The packet generation section removes the tunnel headers of the IP header, the extension header, etc., from the tunnel packet and generates a packet of the same structure as the packet transmitted from the host 11 (for example, P10). The packet transmission-reception section transfers the packet to the host 17.

On the other hand, it is assumed that the tunneling unit 16 receives the tunnel packet P21 after transfer of the tunnel packet P20. That is, if the same tunnel packet information as the tunnel packet P21 (for example, the tunnel start point address of the tunnel packet P20 and the packet ID of the destination option header) is stored in the packet information storage section, the tunneling unit 16 determines at step S207 that the received tunnel packet (for example, P21) is already transferred to the host 17, and the process goes to step S209. At step S209, the packet discard section of the computation control section of the tunneling unit 16 discards the received tunnel packet (for example, P21).

As the system is thus configured, each relay such as the router and the tunneling unit performs capsulation processing on the packet received from the source host to copy the tunnel packet and then transmits the tunnel packets in the right-handed direction and the left-handed direction in the ring network made up of the relays and the relays transfer the received tunnel packets in the right-handed direction and the left-handed direction and the copied tunnel packets do not pass through the same relay. Therefore, the packet can reliably arrive at the destination if a fault occurs in any route.

For example, if a fault occurs in the router 15 and packet communications cannot be conducted through the left-handed route LP201 in FIG. 1, the tunneling unit 12 copies the tunnel packet generated based on the packet from the host 11 and transmits the copied packets in the left-handed direction and the right-handed direction, the routers 13 and 14 transfer the right-handed packet (packet P20) along the right-handed route RP200, and the tunneling unit 16 transfers the right-handed packet to the host 17. Therefore, the packet transmitted from the host 11 can reliably arrive at the host 17.

By the way, the routers need to share and grasp the unified transfer directions of the right-handed direction, the left-handed direction, etc., in the ring network. In such a case, the operator may manually set the right-handed direction and the left-handed direction of each router, but one master router may be selected from among the routers and all other routers may follow the definition of the directions determined by the master router to automatically set the directions.

The operation for the master router to unifiedly set the right-handed direction and the left-handed direction of each of the routers made up of the ring network will be discussed with a flowchart to describe the operation of setting the master router (FIG. 14), the packet format of an advertizing packet (FIG. 15), operation schematic representations for the routers to transfer an advertising packet (FIGS. 16 to 18), a flowchart to describe the operation for the master router to transfer a direction determination packet to each router (FIG. 19), the direction determination packet format (FIG. 20), and the format of a direction determination refusal packet (FIG. 21).

For simplicity, in the description to follow, an example of transmitting an advertizing packet from the router 13 to the routers 14 and 15 to select the master router is used. First, at step S301 in FIG. 14, the computation control section 132 of the router 13 starts the OS stored in the storage section 133, then reads and executes the stored program in the OS to control the whole router 13, and then the master router detection section 1323 of the computation control section 132 transmits a master search packet for searching the master router to the routers 14 and 15. The operation for the computation control section 132 of the router 13 to read and execute the program stored in the storage section 133 to control the sections of the router is similar to that in any other router and therefore will not be discussed again.

At step S302, the router 13 determines whether or not the master router can be detected. If the router 13 determines that the master router cannot be detected because it is not selected yet, the process goes to step S303. If the router 13 determines that the master router is detected according to a reply to the master search packet from the master router or the like, the process goes to "A" in FIG. 19.

At step S303, the router 13 transmits an advertising packet (for example, packet P30 in FIG. 15) to the previously assigned link local multicast address (in FIG. 1, routers 14 and 15) to report minRID stored in the transfer information storage section 1326 (identification information of the router having the smallest value in the ring network recognized by the router 13). At this time, the router 13 transmits the advertising packet through the communication interfaces IF130 and IF131.

Figures 15, 16:
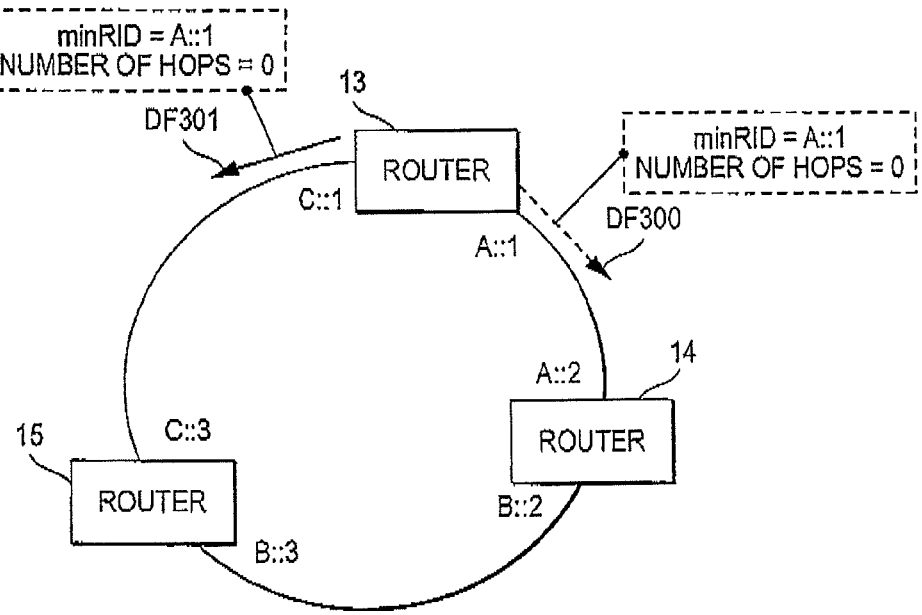
FIG. 15 is a drawing of the packet format of an advertising packet.
FIG. 16 is a schematic representation of the operation for the routers to transfer an advertising packet.

As shown in FIG. 15, the packet P30 has fields of IPv6 header, payload, etc. The IPv6 header has fields of "start point IP address" and "end point IP address", and the payload has fields of "message type," "ring ID," "router ID" of minRID stored in the transfer information storage section 1326 of the router 13, and "number of hops."

As in FIG. 15, the router 13 transmits an advertising packet to the routers 14 and 15, for example. The adverting packet contains the value of the start point IP address (e.g., IPv6 address "A::1" of router 13), the value of the end point IP address (e.g., link local multicast address in the ring network "ff02::100"), the value of the message type (e.g., "advertising"), the value of the ring ID (e.g., "RING1"), the value of the router ID (minRID "A::1" stored in the transfer information storage section 1326 of the router 13), and the number of hops (initial value "0"). The router 14 receives the advertising packet from the router 13 through a communication interface IF140.

Specifically, the router 13 transmits the advertising packet to the routers 14 and 15 as indicated in a flow of packet communication DF300 from the router 13 to the router 14 and a flow of packet communication DF301 from the router 13 to the router 15, as shown in FIG. 16.

At step S304, the router 14 compares the value of the router ID of the advertising packet with the value of minRID stored in the transfer information storage section of the router 14 based on the advertising packet received from the router 13. If the value of minRID of the router 13 stored in the router ID of the advertising packet (for example, "A::1") is smaller than the value of minRID of the router 14 (for example, "A::2"), the process goes to step S305. The magnitude relationship between the IPv6 address and the RID is set to be 9::1<A::1<A::2<B::2<B::3<C::1<C::3.

At step S305, the computation control section of the router 14 stores the value of the router ID of the advertising packet received from the router 13 in the minRID field in the transfer information storage section.

At step S306, the router 14 adds one to the number of hops of the advertising packet received from the router 13 and stores the result (for example, "1") in the field of the number of received hops (for IF140) in the transfer information storage section.

At step S307, if the value of myRID stored in the transfer information storage section is equal to the value of minRID or if the number of received hops (for IF140) stored in the transfer information storage section is greater than "0," the process goes to step S308.

At step S308, the master router detection section of the computation control section of the router 14 generates an advertising packet based on the transfer information stored in the transfer information storage section (for example, the value of minRID "A::1," the number of hops "1") and transfers the advertising packet to the router 15 through another communication interface connected to the ring network (for example, "IF141"). After completion of step S308, the process goes to "A" in FIG. 19.

Figure 17:
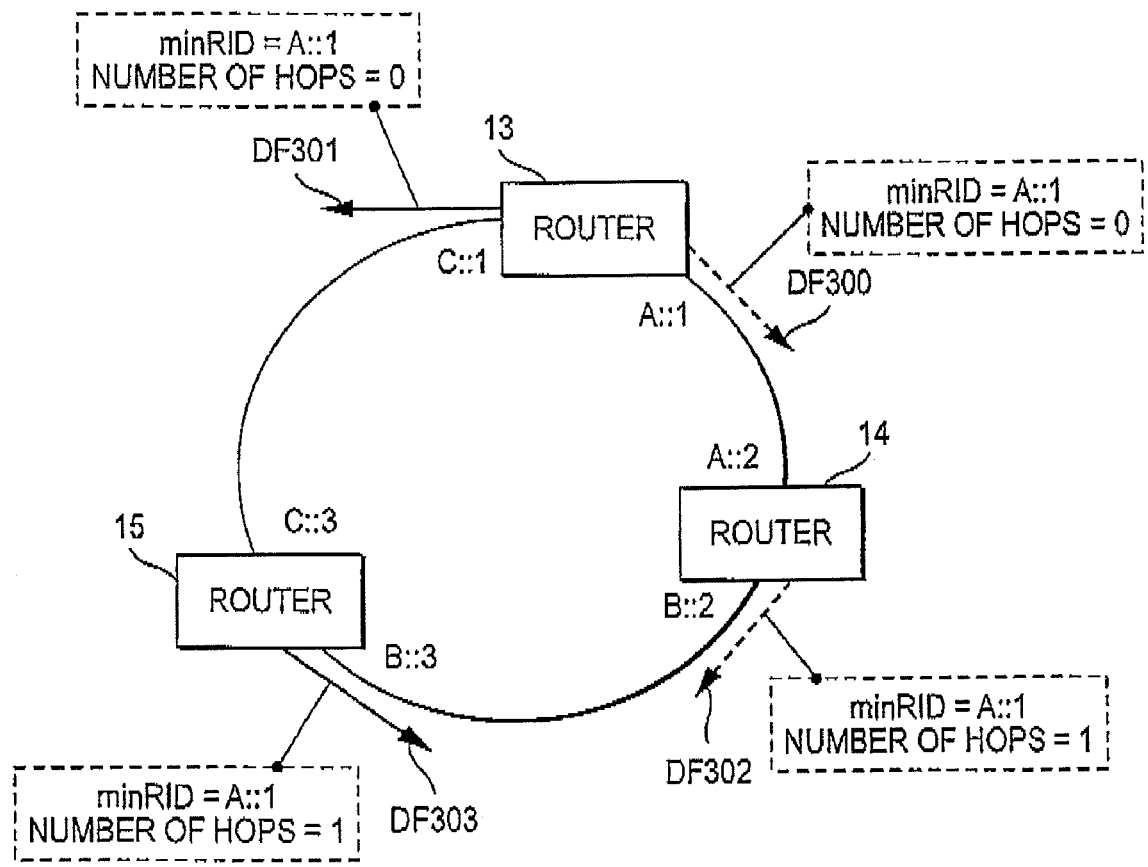
FIG. 17 is a schematic representation of the operation for the routers to transfer an advertising packet.

Specifically, the router 14 transmits the advertising packet to the router 15 as indicated in a flow of packet communication DF302 from the router 14 to the router 15 in FIG. 17. The router 15 also performs the same operation as the router 14 and transmits the advertising packet to the router 14 as indicated in a flow of packet communication DF303 from the router 15 to the router 14.

Figure 18:
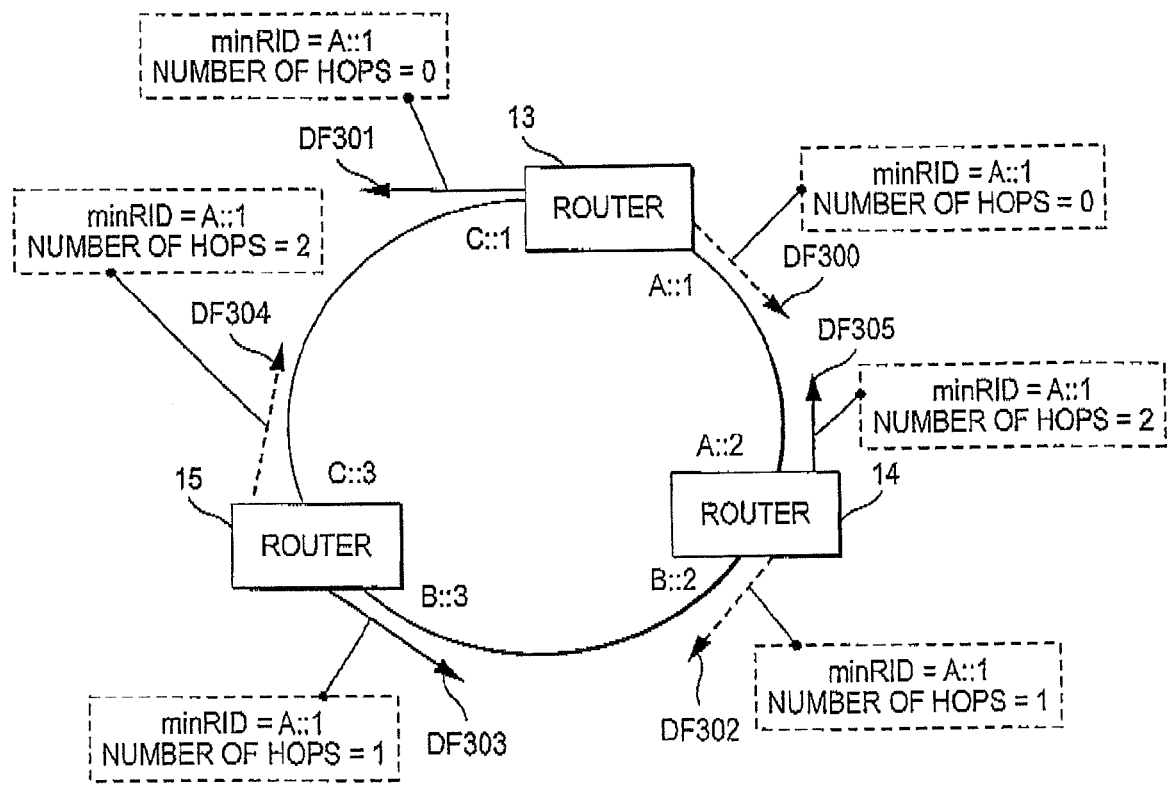
FIG. 18 is a schematic representation of the operation for the routers to transfer an advertising packet.

Further, the router 15 transmits the advertising packet to the router 13 based on the advertising packet received from the router 14 as indicated in a flow of packet communication DF304 from the router 15 to the router 13 in FIG. 18. The router 14 transmits the advertising packet to the router 13 based on the advertising packet received from the router 15 as indicated in a flow of packet communication DF305 from the router 14 to the router 13 in FIG. 18.

Figure 19:
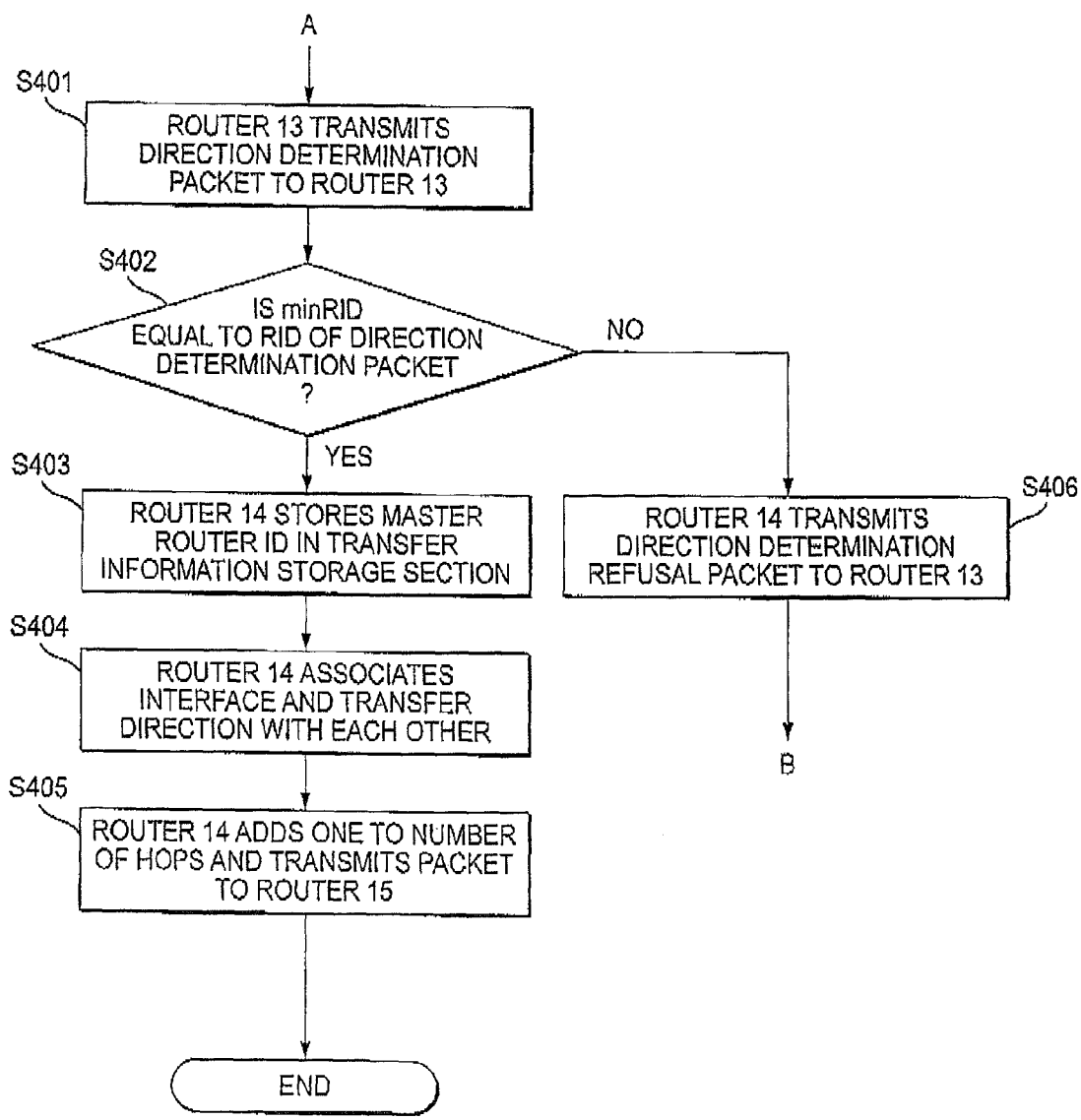
FIG. 19 is a flowchart of the operation for the master router to transfer a direction determination packet to routers.

On the other hand, at step S307, if the value of myRID stored in the transfer information storage section is not equal to the value of minRID or if the number of received hops (for IF140) stored in the transfer information storage section is not greater than "0," the process goes to "A" in FIG. 19.

On the other hand, when the router 15 transmits advertising packet to the router 13 as indicated in the flow of packet communication DF304 in FIG. 18, at step S304, if the value of the router ID of the received advertising packet (for example, "A::1") is not smaller than the value of minRID stored in the transfer information storage section 1326 of the router 13 (for example, "A::1"), the process goes to step S309. At this time, the router 13 receives the advertising packet from the router 15 through the communication interface IF131.

At step S309, the router 13 determines whether or not the value stored in the router ID of the received advertising packet is equal to the value of minRID stored in the transfer information storage section 1326. If the value stored in the router ID of the received advertising packet is equal to the value of minRID, the process goes to step S310.

At step S309, if the value stored in the router ID of the received advertising packet is not equal to the value of minRID, the process goes to step S303.

At step S310, if the value of myRID stored in the transfer information storage section is equal to the value of minRID, the process goes to step S311.

At step S311, the master router detection section of the computation control section of the router 13 determines whether or not the number of received hops (for IF131) stored in the transfer information storage section is "1" or more. If the number of received hops (for IF131) stored in the transfer information storage section is "1" or more, the process goes to step S312.

If the number of received hops (for IF131) stored in the transfer information storage section is less than "1" at step S311, the process goes to "A" in FIG. 19.

At step S312, the master router detection section 1323 of the computation control section 132 of the router 13 adds one to the number of hops of the advertising packet received from the router 15 and stores the result (for example, "1") in the field of the number of received hops (for IF131) in the transfer information storage section 1326, and the master router operation section 1324 starts the operation as the master router. After executing step S312, the process goes to "A" in FIG. 19.

On the other hand, if the value of myRID stored in the transfer information storage section 1326 of the router 13 is not equal to the value of minRID at step S310, the process goes to step S313. At step S313, the master router detection section 1323 of the computation control section 132 of the router 13 adds one to the number of hops of the advertising packet received from the router 15 and stores the result (for example, "1") in the field of the number of hops in the transfer information storage section 1326. After executing step S313, the process goes to "A" in FIG. 19.

Thus, each router transmits the advertising packet to which the recognized minRID is added, and then stores the value of minRID of the received advertising packet or the value of minRID recognized so far, whichever is smaller. Further, each of the routers adds the minRID to the advertising packet, and transfers the advertising packet to any other router. Further, the router having the value of minRID of the received advertising packet being equal to the value of minRID recognized so far and being the same as the value of myRID operates as the master router. Thus, the master router can be selected from among the routers making up the ring network.

Next, the master router transmits a direction determination packet to the routers and associates the interface of each router and the packet transfer direction with each other. Specifically, at step S401 in FIG. 19, the computation control section 132 of the router 13 reads and executes the program stored in the storage section 133 to control the sections of the router, and operates as the master router, and the transfer setting section 1325 of the computation control section 132 transmits a "direction determination packet" to determine the packet transfer direction (for example, direction determination packet P40 in FIG. 20) to the previously assigned link local multicast address.

The direction determination packet P40 has fields of IPv6 header, payload, etc., as shown in FIG. 20. The IPv6 header has fields of "start point IP address" and "end point IP address" and the payload has fields of "message type," "ring ID" of identification information of the ring network, "router ID" of the master router, "number of hops" of the number of transfer routers, and so forth.

The router 13 transmits a direction determination packet to the router 14. The direction determination packet contains the value of the start point IP address (e.g., address "A::1" of router 13), the value of the end point IP address (e.g., address "A::2" of router 14), the value of the message type (e.g., "direction determination"), the ring ID (e.g., "RING1"), the router ID (e.g., RID "A::1" of the router 13), and the number of hops (for example, "0"), for example, as in FIG. 20.

The operation when the router 14 receives the direction determination packet from the router 13 will be discussed. At step S402, the master router detection section of the computation control section of the router 14 determines whether or not the router ID of the direction determination packet (for example, RID "A::1" of router 13) is equal to the value of minRID stored in the transfer information storage section based on the direction determination packet received from the router 13. If the router ID of the direction determination packet is equal to the value of minRID stored in the transfer information storage section, the process goes to step S403.

At step S403, the master router detection section of the computation control section of the router 14 stores the router ID of the direction determination packet in the master router ID field of the transfer information storage section. The master router detection section of the router 14 stores the router ID "A::1" of the direction determination packet in the master router ID field stored in the transfer information storage section, for example.

At step S404, the transfer setting section of the computation control section of the router 14 sets the communication interface receiving the direction determination packet from the router 13 (e.g., communication interface "IF140") to IF-LEFT and another communication interface (e.g., communication interface "IF141") to IF-RIGHT, and then stores interface information in "IF-LEFT assigned IF" and "IF-RIGHT assigned IF" in the transfer information storage section.

At step S405, the transfer setting section of the computation control section of the router 14 controls the communication interface set to IF-RIGHT (e.g., communication interface "IF141") -and transfers the direction determination packet received from the router 13 to the router 15. At this time, the transfer setting section of the router 14 adds one to the number of hops and transmits the direction determination packet to the router 15.

The router 15 performs processing similar to steps S402 to S404, the master router detection section of the router 15 stores the router ID "A::1" of the direction determination packet in the master router ID field, and the transfer setting section of the computation control section of the router 15 sets the communication interface receiving the direction determination packet from the router 14 (e.g., communication interface "IF150") to IF-LEFT and another communication interface (e.g., communication interface "IF151") to IF-RIGHT and stores interface information in "IF-LEFT assigned IF" and "IF-RIGHT assigned IF" in the transfer information storage section.

On the other hand, at step S402, if the router 14 recognizes minRID smaller than the router ID of the master router 13, for example, the router 14 determines that the router ID of the direction determination packet (for example, RID "A::1" of router 13) is not equal to the value of minRID stored in the transfer information storage section (for example, RID "A:: 0") and the process goes to step S406.

At step S406, the master router detection section of the computation control section of the router 14 transmits a direction determination refusal packet (for example, packet P41 in FIG. 21) for reporting refusal of the direction determination to the router 13 of the master router.

The direction determination refusal packet P41 has fields of IPv6 header, payload, etc., as shown in FIG. 21. The IPv6 header has fields of "start point IP address" and "end point IP address" storing the source unicast address of the direction determination packet and the payload has fields of "message type," "ring ID" storing identification information of the ring network, "smallest router ID" storing the smallest router ID in the ring network recognized by the router, "number of hops" of the number of transfer routers, and so forth.

The router 14 transmits a direction determination refusal packet to the router 12. The direction determination refusal packet contains the value of the start point IP address (for example, router 14), the value of the end point IP address (for example, router 13), the value of the message type (for example, "direction determination refusal"), the ring ID (for example, "RING1"), the smallest router ID (for example, "9::1"), and the number of hops (for example, "1"), for example.

The router 13 stores the value of "smallest router ID" of the received direction determination refusal packet in minRID in the transfer information storage section 1326. After executing step S406, the process goes to "B" in FIG. 14.

The router 15 associates the communication interfaces and the packet transfer directions with each other based on the direction determination packet from the router 14 like the operation of the router 14.

Thus, the master router transmits a direction determination packet to the routers and each router transfers the direction determination packet to any other router and sets the communication interface receiving the direction determination packet to IF-LEFT and the communication interface for transmitting the direction determination packet to IF-RIGHT, whereby the communication interfaces of each router and the packet transfer directions can be associated with each other.

In the embodiment, the tunneling unit needs to grasp the addresses of the right-handed packet transfer destination and the let-handed packet transfer destination. In such a case, the operator may manually set the right-handed and left-handed transfer destination addresses of each tunneling unit, but each tunneling unit may automatically acquire and set the right-handed and left-handed transfer destination addresses through the network.

The operation for the tunneling unit to acquire and set the right-handed and left-handed transfer destination addresses will be discussed with FIG. 22 of a flowchart and FIGS. 23 and 24 showing the packet formats of a direction search packet and a direction setting packet.

Figure 22:
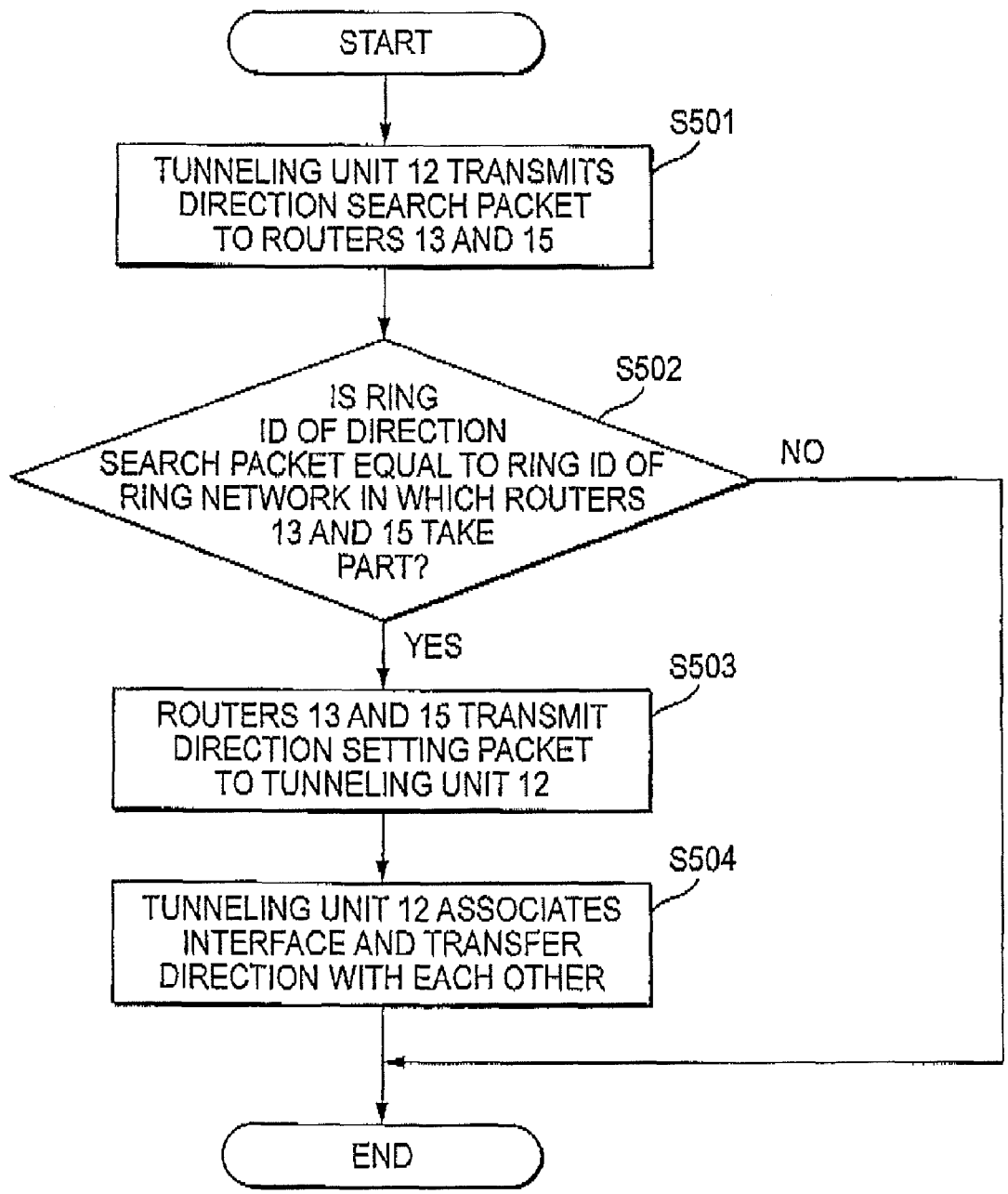
FIG. 22 is a flowchart of the operation for the tunneling unit to acquire and set the transfer destination addresses.

At step S501 in FIG. 22, the tunneling unit 12 transmits a "direction search packet" (for example, direction search packet P50 in FIG. 23) to acquire the addresses of the routers to transmit a right-handed packet and a left-handed packet to the previously-assigned link local multicast address.

The direction search packet P50 has fields of IPv6 header, payload, etc., as shown in FIG. 23. The IPv6 header has fields of "start point IP address" and "end point IP address" and the payload has fields of "message type," "ring ID" of identification information of the ring network, and so forth.

The tunneling unit 12 transmits a direction search packet to the routers 13 and 15. The direction search packet contains the value of the start point IP address (for example, IPv6 address of tunneling unit 12), the value of the end point IP address (for example, "link local multicast address" in the ring network), the value of the message type (for example, "direction search"), and the ring ID (for example, "RING1"), for example.

In the following description, the operation when the router 13 receives the direction search packet from the tunneling unit 12 is taken as an example. At this time, it is assumed that the router 13 receives the direction search packet through the communication interface IF131 of the communication section.

At step S502, the transfer setting section 1325 of the computation control section 132 of the router 13 determines whether or not the ring ID of the direction search packet is equal to the ring ID of the ring network in which the router 13 takes part. If the ring ID of the direction search packet is equal to the ring ID of the ring network in which the router 13 takes part, the process goes to step S503.

At step S503, the transfer setting section 1325 of the computation control section 132 of the router 13 generates a "direction setting packet" (e.g., direction setting packet P51 in FIG. 24) to report the packet transfer direction and then transmits the direction setting packet to the tunneling unit 12.

The direction setting packet P51 has fields of IPv6 header, payload, etc., as shown in FIG. 24. The IPv6 header has fields of "start point IP address" and "end point IP address" and the payload has fields of "message type," "ring ID" of identification information of the ring network, "interface name" of the communication interface receiving the direction search packet (IF-RIGHT, IF-LEFT, etc.), "address" of the IPv6 address assigned to the interface receiving the direction search packet, and so forth.

The router 13 transmits a direction setting packet to the unicast address of the tunneling unit 12. The direction setting packet contains the value of the start point IP address (e.g., IPv6 address "C::1" of router 13), the value of the end point IP address (e.g., IPv6 address of tunneling unit 12), the value of the message type (e.g., "direction setting"), the value of the ring ID (e.g., "RING1"), the interface name (e.g., "IF-LEFT"), and the value of the address (e.g., "C::1"), for example.

At step S504, the direction setting section 1230 of the computation control section 122 of the tunneling unit 12 stores the value of the address of the direction setting packet (for example, "C::1") in the "right-handed packet destination" field in the tunnel creation information storage section 1223 based on the received direction setting packet. That is, the direction setting section 1230 of the tunneling unit 12 sets so as to transmit a right-handed packet to the address of IF-LEFT of the router 13 (for example, "C::1").

The tunneling unit 12 also transmits the direction search packet to the router 15 at the same time as the router 13 and thus operates in a similar manner to steps S501 to S504 described above and can also automatically acquire the address of the left-handed packet transfer destination through the network.

Thus, the tunneling unit transmits a direction search packet to each router using multicasting and each router transmits a direction setting packet containing the interface name of the communication interface receiving the direction search packet (for example, IF-RIGHT, IF-LEFT) and the address assigned to the interface, to the tunneling unit. Therefore, the tunneling unit can acquire the addresses of the right-handed packet transfer destination and the left-handed packet transfer destination.

In the embodiment described above, the routers 13 to 15 make up the ring network, but the present invention is not limited thereto. For example, a plurality of routers may make up a plurality of ring networks.

In the embodiment described above, the tunneling units 12, 16 perform capsulation process on the packet received from the host to generate a tunnel packet, then transfers the tunnel packet to each router. Further, the tunneling units 12, 16 perform decapsulation process on the tunnel packet received from each router to reproduce the packet before capsulated, and transfers the packet to the destination host. However, the present invention is not limited thereto. For example, each host, each router, or a relay having the routing function may have the function of the tunneling unit.

For example, if each of the routers making up the ring network has the function of the tunneling unit, the router connected to the source host performs capsulation process on the packet received from the source host to generate a tunnel packet, then copies the tunnel packet, then adds the transfer direction information indicating the right-handed direction and the left-handed direction of the ring network to the copy tunnel packet, and then transmits the copy tunnel packet to the right-handed route and the left-handed route of the ring network.

The router connected to the destination host performs decapsulation process on the tunnel packet received from another router to reproduce the packet before capsulated, and then transfers the reproduced packet to the destination host based on the network address of the destination host contained in the reproduced packet.

If each host has the function of the tunneling unit, the source host performs capsulation process on the packet destined for the destination host to generate a tunnel packet, then copies the tunnel packet, then adds the transfer direction information indicating the right-handed direction and the left-handed direction of the ring network to the copy tunnel packet, and then transmits the copy tunnel packet to the right-handed route and the left-handed route of the ring network.

The destination host performs decapsulation process on the tunnel packet received from each router to reproduce the packet before capsulated, and then transfers the reproduced packet to the destination host based on the network address of the destination host contained in the reproduced packet.

According to exemplary embodiments of the present invention, the packet communications are conducted between the hosts 11 and 17 using the tunneling communications of the tunneling units 12 and 16. However, if a packet can be transmitted from the source host to the destination host through the right-handed route and the left-handed route of the ring network, it is not necessary to install the tunneling units (i.e., it is not necessary to conduct the tunneling communications).

For example, upon reception of a packet from the source host, each relay of the router adds the transfer direction information to the received packet and transmits the packet in the right-handed direction and the left-handed direction of the ring network. Upon reception of a packet from another router, the relay analyzes the received packet and based on the transfer direction information contained in the received packet and the network address of the destination host, transfers the packet to another relay connected to the relay in the right-handed direction or to the destination host if the transfer direction information in the received packet indicates the right-handed direction and transfers the packet to another relay connected to the relay in the left-handed direction or to the destination host if the transfer direction information in the received packet indicates the left-handed direction.

According to exemplary embodiments of the present invention, the hosts 11 and 17 conduct packet communications through the ring network made up of the routers 13 to 15, but the present invention is not limited thereto. For example, two or more hosts may conduct packet communications through two or more ring networks.

According to exemplary embodiments of the present invention, the tunneling units 12 and 16 conduct tunneling communications through the ring network, but the present invention is not limited thereto. For example, two or more tunneling units may conduct tunneling communications through two or more ring networks.

According to exemplary embodiments of the present invention, the packet may be a packet using an IPv6 header, a hop-by-hop option header, and a destination option header defined in RFC2460 (Internet Protocol Version 6 (IPv6) Specification).

Figure 14:
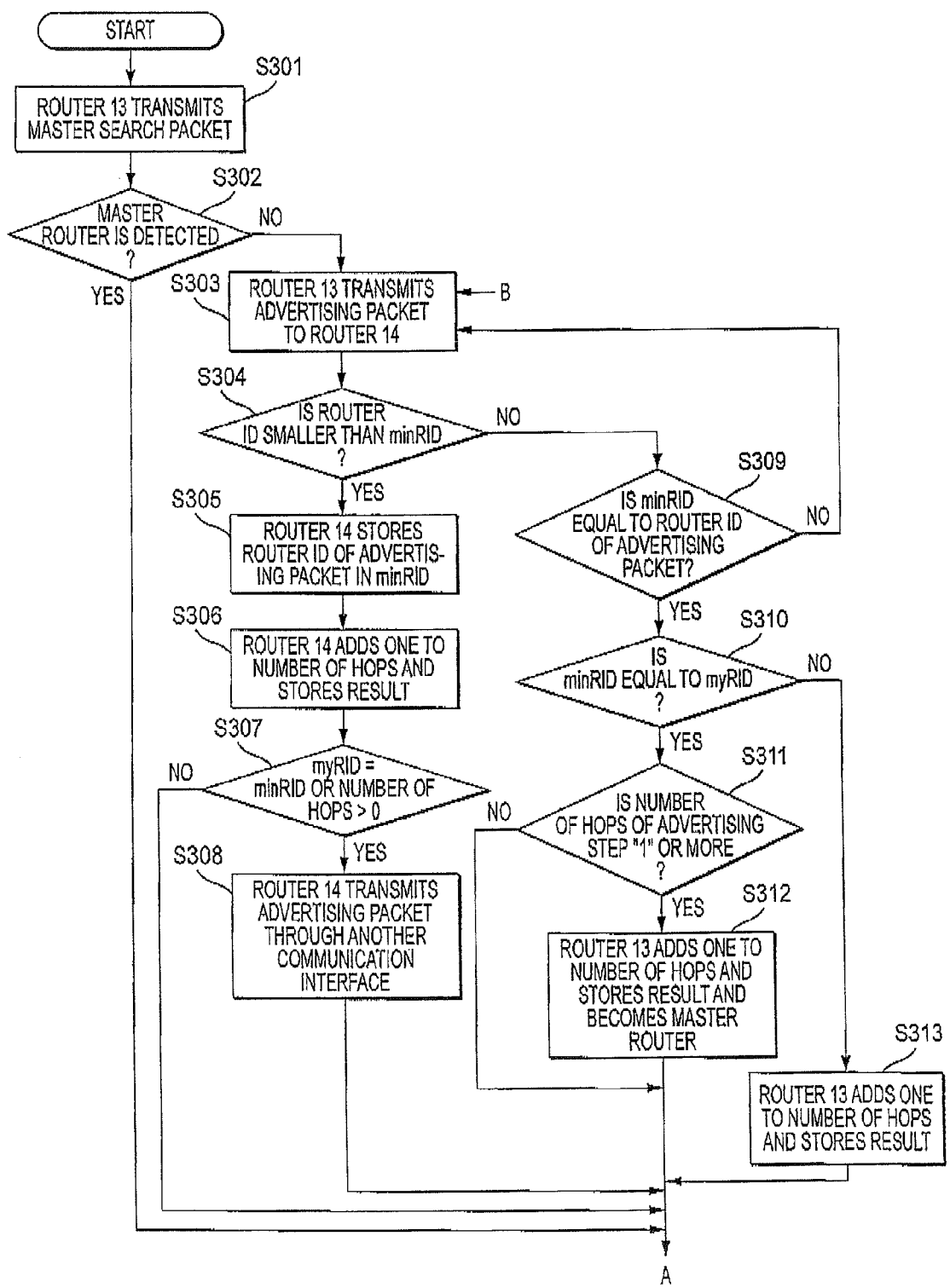
FIG. 14 is a flowchart of the operation of selecting a master router.
Figure 25:
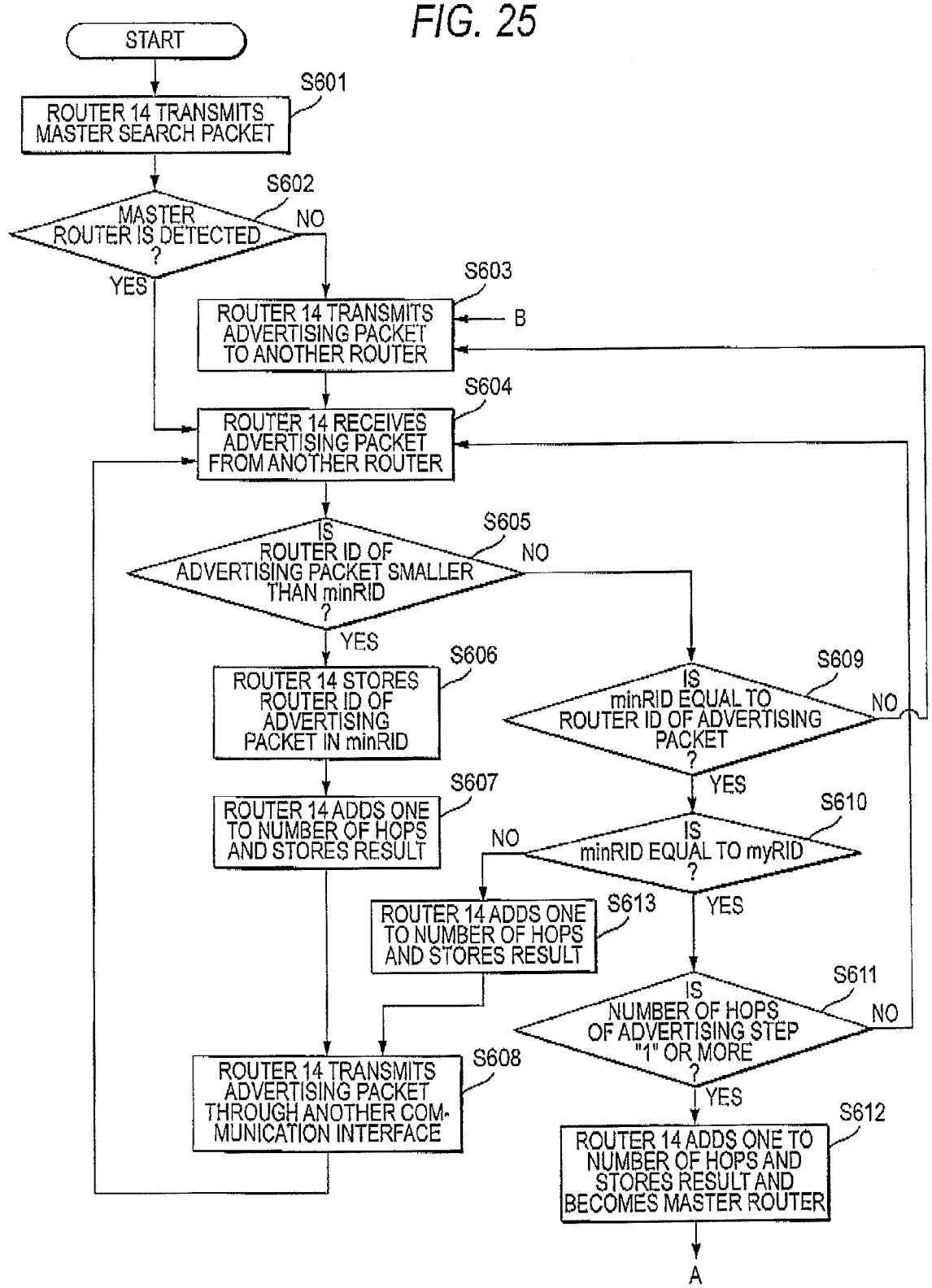
FIG. 25 is another flowchart of the operation of selecting the master router.
Figure 26:
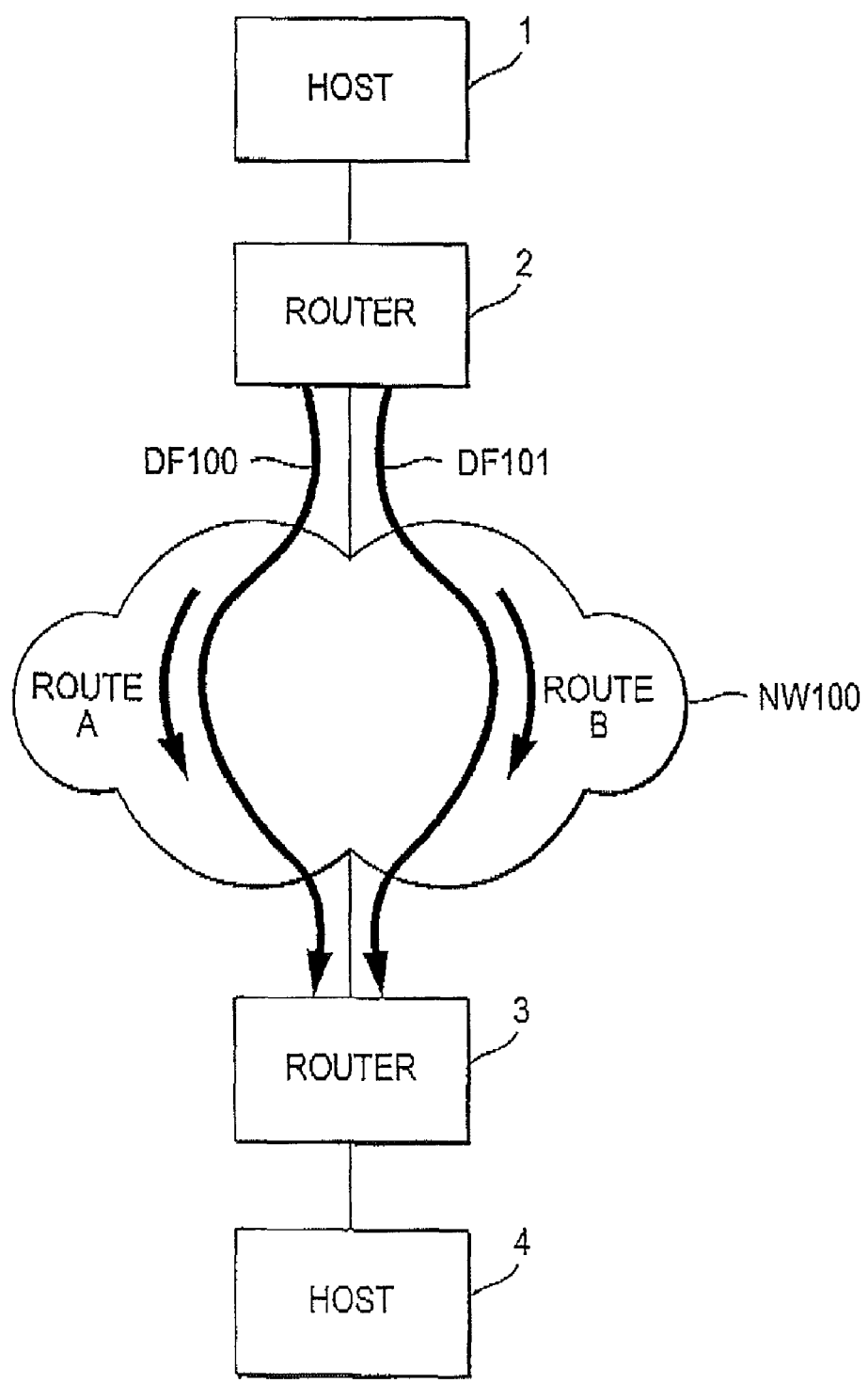
FIG. 26 is a block diagram showing a configuration example of an IP network system in the related art.
Figure 27:
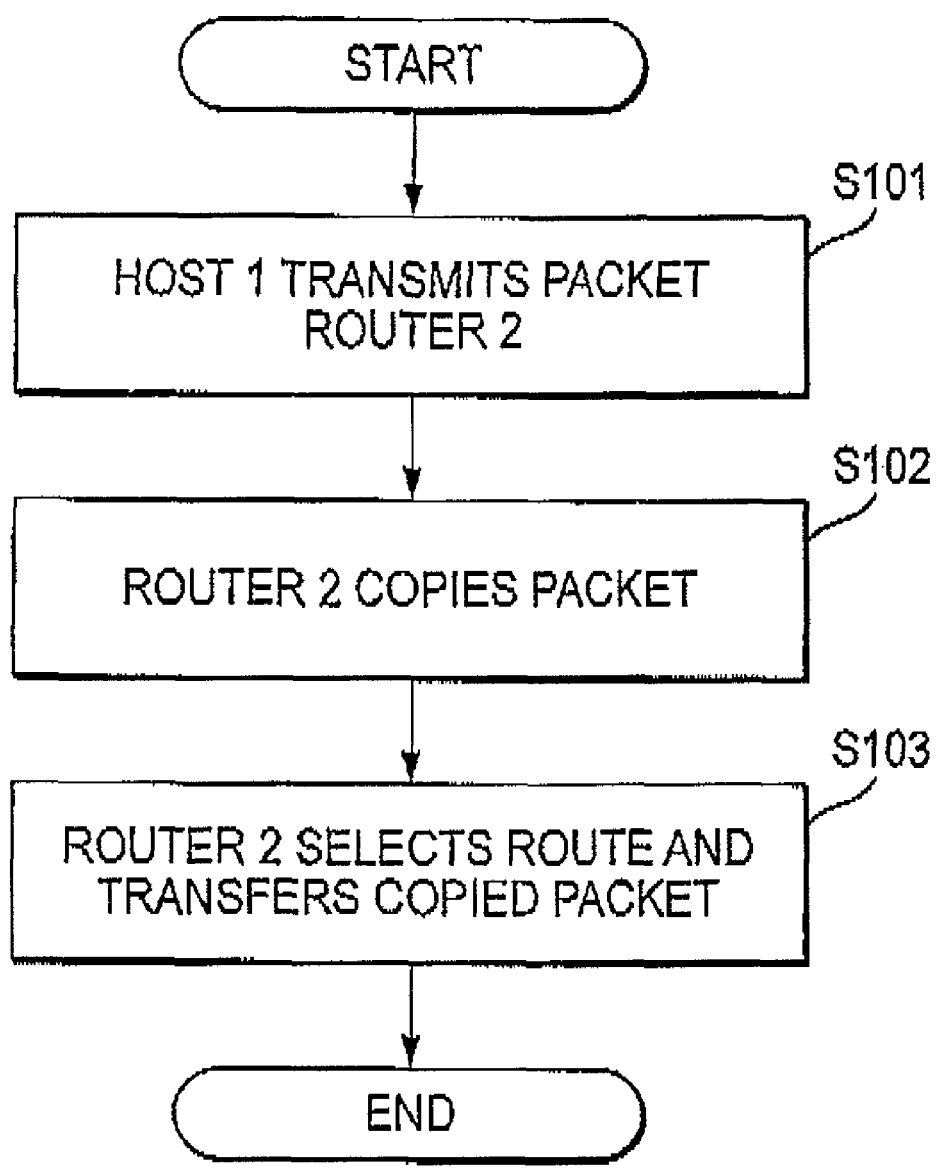
FIG. 27 is a flowchart to describe the operation of the IP network system in the related art.

Also, the IP network system of the present invention is not limited to the flowchart of the operation shown in FIG. 14. For example, the master router may be selected in accordance with the following flowchart. FIG. 25 is another flowchart of the operation of selecting the master router. Firstly, at step S601 shown in FIG. 25, the computation control section of the router 14 starts the OS stored in the storage section, then reads and executes the stored program in the OS to control the whole router 14, and then the master router detection section of the computation control section transmits a master search packet for searching the master router to the routers 13 and 15. The operation for the computation control section of the router 14 to read and execute the program stored in the storage section 133 to control the sections of the router is similar to that in any other router and therefore their description will be omitted hereinafter.

At step S602, the router 14 determines whether or not the master router can be detected. If the router 14 determines that the master router cannot be detected because it is not selected yet, the process goes to step S603. If the router 14 determines that the master router is detected according to a reply to the master search packet from the master router, the process goes to S604.

At step S603, the router 14 transmits an advertising packet (for example, packet P30 in FIG. 15) to the previously assigned link local multicast address (in FIG. 1, routers 13 and 15) to report minRID stored in the transfer information storage section 1326 (identification information of the router having the smallest value in the ring network recognized by the router 14). At this time, the router 14 transmits the advertising packet through the communication interfaces IF140 and IF141.

At step S604, a router (e.g., the router 14) receives the advertising packet from another router (e.g., the router 13).

At S605, the router 14 compares the value of the router ID of the advertising packet with the value of minRID stored in the transfer information storage section of the router 14 based on the advertising packet received from the router 13. If the value of minRID of the router 13 stored in the router ID of the advertising packet (for example, "A::1") is smaller than the value of minRID of the router 14 (for example, "A::2"), the process goes to step S606. The magnitude relationship between the IPv6 address and the RID is set to be 9::1<A::1<A::2<B::2<B::3<C::1<C::3.

At step S606, the computation control section of the router 14 stores the value of the router ID of the advertising packet received from the router 13 in the minRID field in the transfer information storage section.

At step S607, the router 14 adds one to the number of hops of the advertising packet received from the router 13 and stores the result (for example, "1") in the field of the number of received hops (for IF140) in the transfer information storage section.

At step S608, if the number of received hops (for IF140) stored in the transfer information storage section is greater than "0", the master router detection section of the computation control section of the router 14 generates an advertising packet based on the transfer information stored in the transfer information storage section (for example, the value of minRID "A::1," the number of hops "1") and transfers the advertising packet to the router 15 through another communication interface connected to the ring network (for example, "IF141"). After completion of step S608, the process goes to step S604.

At step S605, if the value of the router ID of the received advertising packet (for example, "A::1") is not smaller than the value of minRID stored in the transfer information storage section of the router 14 (for example, "A::1"), the process goes to step S609.

At step S609, the router 14 determines whether or not the value stored in the router ID of the received advertising packet is equal to the value of minRID stored in the transfer information storage section. If the route 14 determines that the value stored in the router ID of the received advertising packet is equal to the value of minRID, the process goes to step S610.

At step S609, if the router 14 determines that the value stored in the router ID of the received advertising packet is not equal to the value of minRID, the process goes to step S603.

At step S610, if the master router detection section of the router 14 determines that the value of myRID stored in the transfer information storage section is equal to the value of minRID, the process goes to step S611.

At step S611, the master router detection section of the computation control section of the router 14 determines whether or not the number of received hops stored in the transfer information storage section is "1" or more. If the number of received hops stored in the transfer information storage section is "1" or more, the process goes to step S612.

Also, at step S611, if the number of the hops stored in the transfer information storage section is not "1" or more, the process goes to step S604.

At step S612, the master router detection section of the router 14 adds one to the number of hops of the advertising packet received from another router and stores the result (for example, "3") in the field of the number of received hops in the transfer information storage section, and the master router operation section starts the operation as the master router. After executing step S612, the process goes to "A" in FIG. 19.

At step S610, if the value of myRID stored in the transfer information storage section is not equal to the value of minRID, the process goes to step S613. At step S613, the master router detection section of the router 14 adds one to the number of hops of the advertising packet received from another router and stores the result (for example, "1") in the field of the number of hops in the transfer information storage section. After executing step S613, the process goes to step S608.

Thus, each router transmits the advertising packet to which the recognized minRID is added, and then stores the value of minRID of the received advertising packet or the value of minRID recognized so far, whichever is smaller. Further, each of the routers adds the minRID to the advertising packet, and transfers the advertising packet to any other router. Further, the router having the value of minRID of the received advertising packet being equal to the value of minRID recognized so far and being the same as the value of myRID operates as the master router. Thus, the master router can be selected from among the routers making up the ring network.

As described above, according to exemplary embodiments of the present invention, the IP network system in which a packet can reliably arrive at the destination if a fault occurs in any route can be implemented and each router can automatically grasp the transfer direction of the right-handed direction, the left-handed direction, etc., in the ring network and the tunneling unit can automatically acquire the addresses of the right-handed packet destination and the left-handed packet destination.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. An IP network system comprising:
a plurality of relays making up a ring network;
a source host for transmitting a packet and connected to the ring network; and
a destination host which conducts a packet communication with the source host through the ring network,
wherein each of the relays is operable to transfer received packets containing a transfer direction information to the destination host through a right-handed route of the ring network and through a left-handed route of the ring network, based on the transfer direction information, further comprising:
a plurality of tunneling units connected to the ring network, the tunneling units comprising:
a source tunneling unit connected to the source host; and
a destination tunneling unit connected to the destination host, wherein the source tunneling unit is operable to:
a) perform capsulation on a packet from the source host to generate a tunnel packet;
b) copy the tunnel packet to generate a copy tunnel packet;
c) add the transfer direction information to the copy tunnel packet and the tunnel packet; and
d) transmit the tunnel packet and the copy tunnel packet to which the transfer direction information is added, to the right-handed route and the left-handed route of the ring network,
wherein each of the tunneling units comprises:
a communication section for conducting the packet communication;
a storage section for storing at least one network address of the relays connected to the tunneling unit and the source and destination hosts; and
a computation control section, wherein the computation control section is operable to:
a) perform the capsulation on the packet from the source host to generate the tunnel packet;
b) copy the tunnel packet to generate a copy tunnel packet;
c) add the transfer direction information and a network address of a destination relay to the copy tunnel packet and the tunnel packet;
d) control the communication section to transfer the copy tunnel packet and the tunnel packet to the destination tunneling unit through any route of the ring network;
e) perform decapsulation on the tunnel packet received by the destination tunneling to reproduce the packet before subjected to the capsulation;
f) control the communication section to transfer the reproduced packet to the destination host based on information about the destination host contained in the reproduced packet; and
g) store the reproduced packet in the storage section.

2. The IP network system of claim 1, wherein
if the reproduced packet is already stored in the storage section, the computation control section is operable to discard the reproduced packet.

3. The IP network system of claim 1, wherein each of the relays transmits a direction setting packet for setting a transfer direction to a different relay connected to the same ring network and shares the transfer direction with the different relay.

4. The IP network system of claim 3, wherein each of the relays comprises:
- a communication section for conducting the packet communication;
- a storage section for storing at least one network address of other relays connected to the relay and the source and destination hosts; and
- a section for transmitting the direction setting packet to the different relay connected to the same ring network and setting one communication interface for receiving the direction setting packet from the different relay as an interface for transmitting a packet in the left-handed direction and setting another communication interface as an interface for transmitting a packet in the right-handed direction.

5. An IP network system comprising:
- a plurality of relays making up a ring network;
- a source host for transmitting a packet and connected to the ring network; and
- a destination host which conducts a packet communication with the source host through the ring network, wherein each of the relays is operable to transfer received packets containing a transfer direction information to the destination host through a right-handed route of the ring network and through a left-handed route of the ring network, based on the transfer direction information, wherein each of the relays is operable to:
- a) perform capsulation on a packet from the source host to generate a tunnel packet;
- b) copy the tunnel packet to generate a copy tunnel packet;
- c) add the transfer direction information to the tunnel packet and the copy tunnel packet; and
- d) conduct a tunneling communication in the ring network, wherein each of the relays comprises:
- a communication section for conducting the packet communication;
- a storage section for storing at least one network address of other relays connected to the relay and the source and destination hosts; and
- a computation control section that analyzes the received packets containing the transfer direction information and information about the destination host, and then controls the communication section to transfer the packets to any route of the ring network, based on the transfer direction information and the information about the destination host, wherein the computation control section is operable to:
- a) perform the capsulation on the packet from the source host to generate the tunnel packet;
- b) copy the tunnel packet to generate a copy tunnel packet;
- c) add the transfer direction information and a network address of a destination relay to the copy tunnel packet and the tunnel packet;
- d) control the communication section to transfer the copy tunnel packet and the tunnel packet to the destination relay through any route of the ring network;
- e) perform decapsulation on the tunnel packet received by the destination relay to reproduce the packet before subjected to the capsulation;
- f) control the communication section to transfer the reproduced packet to the destination host based on the information about the destination host contained in the reproduced packet; and
- g) store the reproduced packet in the storage section.

6. The IP network system of claim 5, wherein if the reproduced packet is already stored in the storage section, the computation control section is operable to discard the reproduced packet.

* * * * *